(12) United States Patent
Russo, Jr. et al.

(10) Patent No.: US 10,506,103 B2
(45) Date of Patent: *Dec. 10, 2019

(54) CONSUMER PREFERENCE AND MAINTENANCE INTERFACE

(71) Applicant: MarkeTouch Media, Inc., Houston, TX (US)

(72) Inventors: Charles E. Russo, Jr., Houston, TX (US); Lyle M. Green, Pacific Palisades, CA (US); Randolph A. Rice, Austin, TX (US); Stephen M. Forrette, Houston, TX (US)

(73) Assignee: MarkeTouch Media, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/417,114

(22) Filed: May 20, 2019

(65) Prior Publication Data

US 2019/0273822 A1 Sep. 5, 2019

Related U.S. Application Data

(63) Continuation of application No. 15/396,337, filed on Dec. 30, 2016, now Pat. No. 10,298,754.

(60) Provisional application No. 62/273,409, filed on Dec. 30, 2015.

(51) Int. Cl.
*H04M 3/51* (2006.01)
*H04M 3/42* (2006.01)
*H04M 7/00* (2006.01)

(52) U.S. Cl.
CPC ....... *H04M 3/5158* (2013.01); *H04M 3/5166* (2013.01); *H04M 7/0042* (2013.01); *H04M 3/42382* (2013.01); *H04M 2203/2088* (2013.01)

(58) Field of Classification Search
None
See application file for complete search history.

(56) References Cited

U.S. PATENT DOCUMENTS

| 7,209,916 B1 | 4/2007 | Seshadri et al. |
| 8,478,310 B2 | 7/2013 | Reding et al. |
| 8,660,258 B2 | 2/2014 | Zyarko et al. |
| 8,839,311 B1 | 9/2014 | Hendren et al. |

(Continued)

*Primary Examiner* — Harry S Hong
(74) *Attorney, Agent, or Firm* — Holland & Hart LLP

(57) ABSTRACT

Methods, systems, and devices for consumer contact are described. In some aspects, an example method may include receiving an indication to notify a consumer and identifying a text-capable contact number associated with the consumer. The example method may also include determining a disconnect date at which the text-capable contact number was disconnected and comparing the disconnect date with a notification date associated with receiving the indication to notify the consumer. Additionally, the example method may include determining whether to notify the consumer via the text-capable contact number based on the comparison of the disconnect date with the notification date. In some aspects, the example method may include identifying whether a primary contact number for which to notify the consumer is a text-capable phone number. In other aspects, the example method may include soliciting the consumer to obtain a substitute contact number that can be used as a text-capable contact number.

17 Claims, 12 Drawing Sheets

(56) References Cited

U.S. PATENT DOCUMENTS

| | | | |
|---|---|---|---|
| 10,298,754 B2 * | 5/2019 | Green | H04M 3/5158 |
| 2003/0039339 A1 | 2/2003 | Luehrig et al. | |
| 2006/0095575 A1 | 5/2006 | Sureka et al. | |
| 2007/0073808 A1 | 3/2007 | Berrey et al. | |
| 2009/0106138 A1 | 4/2009 | Smith et al. | |
| 2009/0238353 A1 | 9/2009 | Mani | |
| 2009/0286559 A1 | 11/2009 | Janas et al. | |
| 2010/0004007 A1 | 1/2010 | Vogel et al. | |
| 2010/0124318 A1 | 5/2010 | Cai et al. | |
| 2010/0241578 A1 | 9/2010 | McLaughlin | |
| 2011/0026692 A1 | 2/2011 | Sharp | |
| 2013/0078971 A1 | 3/2013 | Trandal et al. | |
| 2016/0119475 A1 | 4/2016 | Bohlin et al. | |
| 2016/0212266 A1 | 7/2016 | Soundar | |
| 2017/0223187 A1 * | 8/2017 | Green | H04M 7/0042 |

* cited by examiner

CONSUMER PREFERENCE AND MAINTENANCE INTERFACE

CROSS REFERENCES

Field of the Disclosure

The present application for Patent is a Continuation of U.S. patent application Ser. No. 15/396,337 by Green, et al., entitled "Consumer Preference and Maintenance interface," filed Dec. 30, 2016 claims priority to U.S. Provisional Patent Application No. 62/273,409 by Green et al., entitled "Consumer Preference and Maintenance Interface," filed Dec. 30, 2015, each of which is expressly incorporated by reference herein for all purposes.

BACKGROUND

Field of the Disclosure

The following relates generally to contacting consumers, and more specifically to consumer preference and maintenance interface.

Description of Related Art

Companies may interact with customers via calls to the customers' home and mobile phones. Some companies have extensive interaction with their customers such that automated calling can be beneficial to the services provided by these companies. For example, a customer may engage a pharmacy to supply medicaments. As a result, the pharmacy may require a number of pre-sale and post-sale contacts with the customer (e.g., regarding a prescription pick-up). To support a company's interactions with its customers, systems, such as call centers have been developed as a centralized, scalable mechanism to handle the volume of inbound and outbound calls related to various customer contact contexts, including, for example, sales and marketing contacts, service order contacts, technical support issues, and billing questions.

SUMMARY

The described features generally relate to one or more improved methods, systems, or devices that provide for techniques for contacting consumers.

In some examples, a computing device (e.g., a server for inbound and outbound call management) may receive an indication to notify a consumer or customer that includes a primary contact number for that consumer. This indication may be transmitted to the computing device by an entity (e.g., via a remote customer management server) that wishes to contact the consumer and may be derived from a large list of such consumers to contact.

In some cases, the indication may correspond to a first contact to the consumer by the computing device on behalf of the entity wishing to contact the consumer. In other cases, the indication may correspond to a subsequent contact to the consumer by the computing device, and the computing device may have contact and/or communication related information associated with the consumer.

The computing device may determine that the primary contact number for the consumer is a text-capable contact number (e.g., a wireless phone number, in some cases, but may also be a VoIP soft phone number capable of short code texting or the like). In some cases, the primary contact number that is provided in the indication to notify the consumer may be a landline number (e.g., a home telephone number provided by an incumbent local exchange carrier (ILEC) or a competitive local exchange carrier (CLEC)) that is not capable of receiving text messages. The computing device may then solicit a substitute contact number that is text-capable from the consumer (e.g., during an outbound call when the consumer is contacted, or during an inbound call by the consumer after a callback number is provided to the consumer).

In accordance with some aspects, the computing device may check to ensure that the text-capable contact number (e.g., either the original primary contact number or a substitute contact number) remains valid. For example, the computing device may determine a disconnect date at which the text-capable contact number was disconnected. The computing device may compare the disconnect date with a notification date associated with the indication to notify the consumer to determine whether to utilize the text-capable contact number for the future communication.

A method of consumer contact is described. The method may include receiving an indication to notify a consumer, identifying a text-capable contact number associated with the consumer, determining a disconnect date at which the text-capable contact number was disconnected, comparing the disconnect date with a notification date associated with receiving the indication to notify the consumer, and determining whether to notify the consumer via the text-capable contact number based at least in part on the comparison of the disconnect date with the notification date.

A device for consumer contact is described. The device may include a processor, memory in electronic consumer contact with the processor, and instructions stored in the memory. The instructions may be operable to cause the processor to receive an indication to notify a consumer, identify a text-capable contact number associated with the consumer, determine a disconnect date at which the text-capable contact number was disconnected, compare the disconnect date with a notification date associated with receiving the indication to notify the consumer, and determine whether to notify the consumer via the text-capable contact number based at least in part on the comparison of the disconnect date with the notification date.

A non-transitory computer readable medium for consumer contact is described. The non-transitory computer-readable medium may include instructions to cause a processor to receive an indication to notify a consumer, identify a text-capable contact number associated with the consumer, determine a disconnect date at which the text-capable contact number was disconnected, compare the disconnect date with a notification date associated with receiving the indication to notify the consumer, and determine whether to notify the consumer via the text-capable contact number based on the comparison of the disconnect date with the notification date.

Some examples of the method, device, or non-transitory computer-readable medium described above may further include processes, features, or instructions for determining to notify the consumer based on the disconnect date being a first time duration before the notification date.

Some examples of the method, device, or non-transitory computer-readable medium described above may further include processes, features, or instructions for determining not to notify the consumer based on the disconnect date being a second time duration before the notification date.

Some examples of the method, device, or non-transitory computer-readable medium described above may further include processes, features, or instructions for determining an established connect date for the text-capable contact number based on one or more successful notification attempts made to the text-capable contact number.

Some examples of the method, device, or non-transitory computer-readable medium described above may further include processes, features, or instructions for determining to notify the consumer based on the disconnect date being before the established connect date for the text-capable contact number.

Some examples of the method, device, or non-transitory computer-readable medium described above may further include processes, features, or instructions for receiving the indication to notify the consumer that comprise receiving the indication corresponding to a primary contact number of the consumer.

Some examples of the method, device, or non-transitory computer-readable medium described above may further include processes, features, or instructions for identifying the text-capable contact number associated with the consumer that comprise referencing the primary contact number of the consumer and determining that the primary contact number is a phone number capable of receiving text messages.

Some examples of the method, device, or non-transitory computer-readable medium described above may further include processes, features, or instructions for identifying the text-capable contact number associated with the consumer that comprise referencing the primary contact number of the consumer, determining that the primary contact number is not a phone number capable of receiving text messages, and receiving the text-capable contact number as a substitute contact number for the consumer based at least in part on an opt-in process associated with the primary contact number.

Some examples of the method, device, or non-transitory computer-readable medium described above may further include processes, features, or instructions for determining not to notify the consumer based on the comparison of the disconnect date with the notification date. Some examples of the method, device, or non-transitory computer-readable medium described above may further include processes, features, or instructions for determining to notify the consumer via the primary contact number.

Some examples of the method, device, or non-transitory computer-readable medium described above may further include processes, features, or instructions for receiving disconnect information for a plurality of numbers.

In some examples of the method, device, or non-transitory computer-readable medium described above, the notification date is associated with receipt of the indication to notify the consumer.

In some examples of the method, device, or non-transitory computer-readable medium described above, the notification date is associated with a predetermined date to notify the consumer.

A method of consumer contact is described. The method may include receiving an indication to notify a consumer, identifying whether a primary contact number for which to notify the consumer is a text-capable phone number, placing an outbound call to the primary contact number based at least in part on receiving the indication to notify the consumer, determining whether the outbound call to the primary contact number is answered by a person, and providing a future communications message and a prompt to allow the consumer to enter a substitute contact number for receiving future communications via text messages, when the primary contact number is not identified as a text-capable phone number and the outbound call is determined to be answered by a person.

A device for consumer contact is described. The device may include a processor, memory in electronic consumer contact with the processor, and instructions stored in the memory. The instructions may be operable to cause the processor to receive an indication to notify a consumer, identifying whether a primary contact number for which to notify the consumer is a text-capable phone number, place an outbound call to the primary contact number based at least in part on receiving the indication to notify the consumer, determine whether the outbound call to the primary contact number is answered by a person, and provide a future communications message and a prompt to allow the consumer to enter a substitute contact number for receiving future communications via text messages, when the primary contact number is not identified as a text-capable phone number and the outbound call is determined to be answered by a person.

A non-transitory computer readable medium for consumer contact is described. The non-transitory computer-readable medium may include instructions to cause a processor to receive an indication to notify a consumer, identifying whether a primary contact number for which to notify the consumer is a text-capable phone number, place an outbound call to the primary contact number based at least in part on receiving the indication to notify the consumer, determine whether the outbound call to the primary contact number is answered by a person, and provide a future communications message and a prompt to allow the consumer to enter a substitute contact number for receiving future communications via text messages, when the primary contact number is not identified as a text-capable phone number and the outbound call is determined to be answered by a person.

Some examples of the method, device, or non-transitory computer-readable medium described above may further include processes, features, or instructions for receiving, by the computing device, the substitute contact number, determining that the substitute contact number is a text-capable phone number, sending a confirmation communication to the substitute contact number based at least in part on the determining that the substitute contact number is a text-capable phone number, and receiving an acknowledgement of the confirmation communication from the substitute contact number.

Some examples of the method, device, or non-transitory computer-readable medium described above may further include processes, features, or instructions for identifying whether the primary contact number for which to notify the consumer is a text-capable contact number that comprise performing a real-time database dip on the primary contact number to ascertain whether a phone number of the primary contact number is associated with a text-capable carrier entity.

Some examples of the method, device, or non-transitory computer-readable medium described above may further include processes, features, or instructions for identifying whether the primary contact number for which to notify the consumer is a text-capable contact number that comprise accessing a local disconnect activity database of the computing device, the local disconnect activity database including known text-capable phone numbers and non-text-capable phone numbers.

Some examples of the method, device, or non-transitory computer-readable medium described above may further include processes, features, or instructions for determining that the substitute contact number is different from the primary contact number and sending the substitute contact number to a third-party entity computing device based at least in part on the substitute contact number is different from the primary contact number.

A method of consumer contact is described. The method may include receiving an indication to notify a consumer, identifying whether a primary contact number for which to notify the consumer is a text-capable phone number, placing an outbound call to the primary contact number based at least in part on receiving the indication to notify the consumer, determining that the outbound call to the primary contact number is answered by an answering system, providing a callback message that includes a designated telephone number for the consumer to call, receiving an incoming call on the designated telephone number, and determining whether the incoming call is associated with identifiable consumer identification information.

A device for consumer contact is described. The device may include a processor, memory in electronic consumer contact with the processor, and instructions stored in the memory. The instructions may be operable to cause the processor to receive an indication to notify a consumer, identify whether a primary contact number for which to notify the consumer is a text-capable phone number, place an outbound call to the primary contact number based at least in part on receiving the indication to notify the consumer, determine that the outbound call to the primary contact number is answered by an answering system, provide a callback message that includes a designated telephone number for the consumer to call, receive an incoming call on the designated telephone number, and determine whether the incoming call is associated with identifiable consumer identification information.

A non-transitory computer readable medium for consumer contact is described. The non-transitory computer-readable medium may include instructions to cause a processor to receive an indication to notify a consumer, identify whether a primary contact number for which to notify the consumer is a text-capable phone number, place an outbound call to the primary contact number based at least in part on receiving the indication to notify the consumer, determine that the outbound call to the primary contact number is answered by an answering system, provide a callback message that includes a designated telephone number for the consumer to call, receive an incoming call on the designated telephone number, and determine whether the incoming call is associated with identifiable consumer identification information.

Some examples of the method, device, or non-transitory computer-readable medium described above may further include processes, features, or instructions for providing a future communications message and a prompt to allow the consumer to select the primary contact number for receiving future communications via text messages, when the primary contact number is identified as a text-capable phone number and the incoming call is determined to be the primary contact number.

Some examples of the method, device, or non-transitory computer-readable medium described above may further include processes, features, or instructions for providing a future communications message and a prompt to allow the consumer to enter a substitute contact number for receiving future communications via text messages, when the primary contact number is not identified as a text-capable phone number and the incoming call is determined to be associated with identifiable consumer identification information.

DETAILED DESCRIPTION

Figure 1:
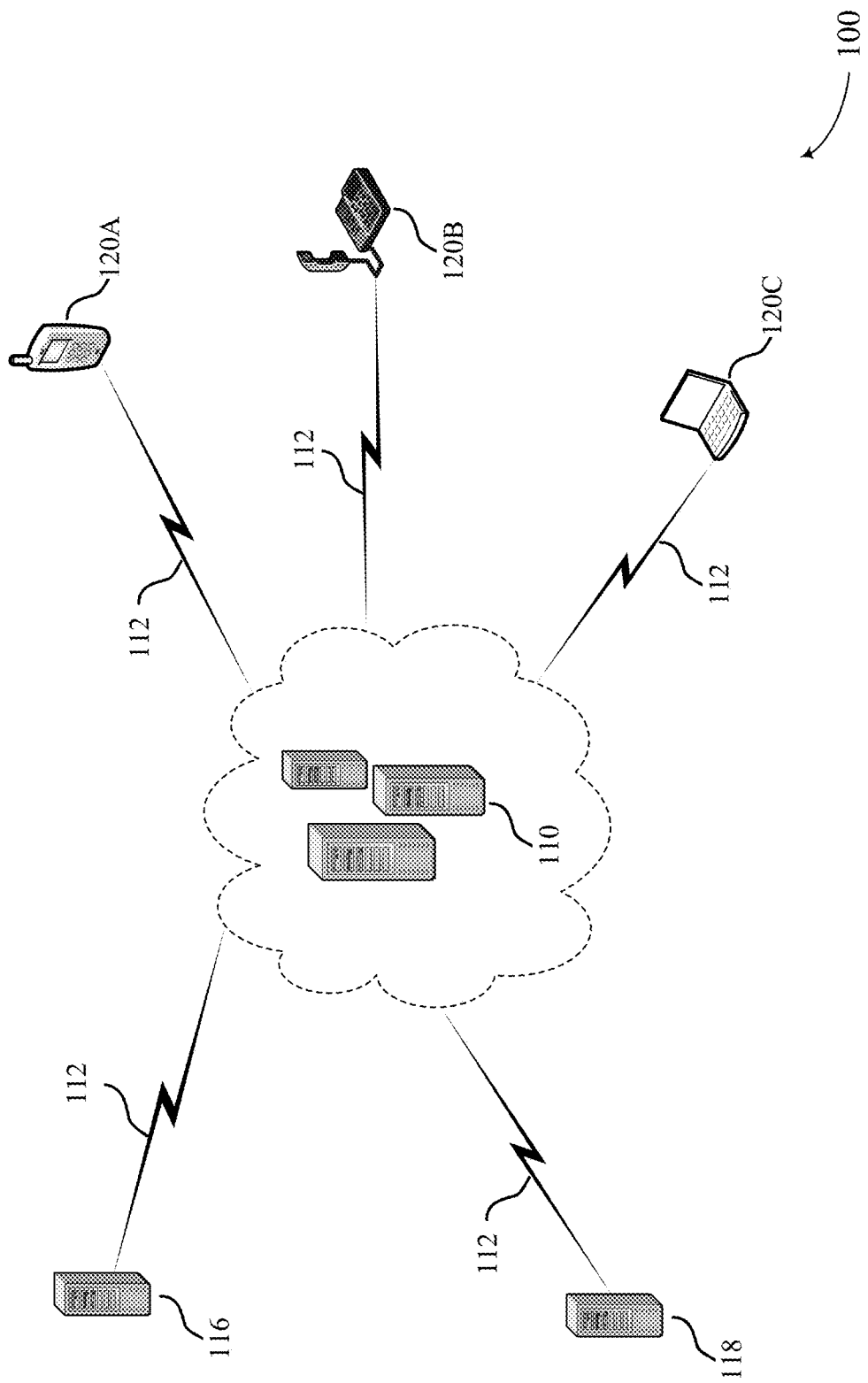
FIG. 1 illustrates an example of a consumer notification system that includes one or more consumer preference and maintenance interface servers in accordance with aspects of the present disclosure.

In accordance with some aspects of the present disclosure, a computing device (e.g., a server for inbound and outbound call management such as a consumer preference and maintenance interface server or the like) may receive an indication to notify a consumer or customer. The indication can be related to contacting a consumer to notify the consumer that a prescription is available for pick-up at a pharmacy. The indication may be related to contacting a consumer regarding a service order that the consumer has scheduled (e.g., an installation for cable or telecommunication services). The indication can be related to can be related to contacting a consumer for various pre-sale/service or post-sale/service contacts with the consumer. This indication may be transmitted to the computing device from an entity (e.g., a third-party entity different from the owner of the computing device) that wishes to contact the consumer. For example, the computing device may receive the indication to notify a consumer via a remote customer management server. In some implementations, however, the computing device and a customer management system may be an integrated system, collocated servers, or the like. The indication to notify a consumer may be derived from a large list of such consumer to contact (e.g., a bulk list of consumers to contact for a similar notification purpose such as sales promotion or a network outage, or a bulk list of consumers to contact for specific notification information for each consumer such as a prescription pickup details).

In some cases, the indication to notify a consumer may correspond to a first contact to the consumer by the computing device on behalf of the entity wishing to contact the consumer. In other cases, the indication to notify a consumer may correspond to a subsequent contact to the consumer by the computing device. Accordingly, the computing device may have contact and/or communication related information associated with the consumer (e.g., historical call attempt data associated with previous attempts to contact the consumer). In some examples, this contact and/or communication related information can be used to determine whether to contact the consumer via a particular contact number associated with the consumer.

The computing device may determine that the primary contact number for the consumer is a text-capable contact number (e.g., a wireless phone number, in some cases, but may also be a VoIP soft phone number capable of short code texting or the like). In some cases, information associated with the consumer may include a preferred contact number (e.g., a text capable contact number such as a wireless phone number) different from the primary contact number (e.g., a landline number or other phone number that is not capable of receiving text messages) used in the indication to notify the consumer. This preferred contact information may be ascertained by the computing device during consumer contact operations as the indication to contact the consumer may include only the primary contact number in some examples. For example, the computing device many determine that the primary contact number that is provided with the indication to notify the consumer (e.g., either an initial indication or subsequent indication) may be a landline number (e.g., a home telephone number provided by an incumbent local exchange carrier (ILEC) or a competitive local exchange carrier (CLEC)) that is not capable of receiving text messages.

The computing device may solicit a substitute/alternative contact number that is text-capable from the consumer. For example, during an outbound call when the consumer is contacted, the computing device may determine that a call to the primary contact number is answered by a person. The computing device may provide a prompt to enter a substitute contact number (e.g., a text-capable contact number) for receiving future communications via text messages. In some examples, the computing device may determine that a call to the primary contact number is answered by an answering system (e.g., an answering machine connected to a landline home phone number or a voice mail system operatively coupled to a wireless phone number). The computing device may provide a callback number on the answering system for the consumer. When the consumer calls back and the computing device receives the incoming call, the computing device may provide a prompt to enter a substitute contact number (e.g., a text-capable contact number) for receiving future communications via text messages. In some cases, the computing device may verify that the substitute contact number entered by the consumer is accurate and valid (e.g., by a confirming text and acknowledgement response text), particularly when the communications concern medical or pharmaceutical subject matter and/or other proprietary or confidential information.

When the computing device has a future communication to send to the consumer and has a text-capable contact number (e.g., either the original primary contact number or a substitute contact number) for the consumer, the computing device may check to ensure that the text-capable contact number remains valid. For example, the future communication may be provided a few months or years after the initial contact with the consumer and determination of the consumer's preference to utilize a text-capable number. To this end, the computing device may determine a disconnect date at which the text-capable contact number was disconnected from service. The computing device may access a list of disconnected wireless numbers compiled from external sources (e.g., as provided by certain wireless carriers or third-party vendors reselling this information) and/or determinations based on failed call attempts to the text-capable contact numbers. The computing device may then compare a disconnect date of the text-capable contact number with a notification date associated with receiving the indication to notify the consumer. In some cases, the notification date will be the date when the indication to notify the consumer was received. In other cases, however, the notification date may be the date that the computing device attempts to contact the consumer or may be a specified date at which the entity wishes that the consumer be notified or contacted (e.g., sometime after the initial indication to notify the consumer was received).

It is to be appreciated that an entity must comply with various regulations such as, but not limited to, the National Do Not Call Registry when contacting a consumer. Additionally, in aggregate, an entity's interactions with their entire consumer base may be quite extensive (e.g., hundreds or thousands of calls per day). However, an interaction with a particular consumer may be infrequent (e.g., one call, text, or email every six to nine months) in some cases. Thus, the computing device may determine whether to notify the consumer via the text-capable contact number based at least in part on the comparison of the disconnect date with the notification date. For example, if the disconnect date is within a few months (e.g., one to three months) of the notification date, then the computing device may determine not to contact the consumer via the text-capable contact number. If the disconnect date is within several months (e.g., nine months or more) of the notification date, then the computing device may determine to contact the consumer via the text-capable contact number making an assumption that the disconnect date for the text-capable contact number is associated with disconnect activity related to different user (e.g., a previous user of a wireless phone number or VoIP soft phone number capable of short code texting) than that of the consumer that the entity wishes to notify or contact.

Aspects of the disclosure are initially described in the context of an example consumer notification system that includes one or more example consumer preference and maintenance interface servers. Aspects of the disclosure are further illustrated by and described with reference to device diagrams, system diagrams, and flowcharts that relate to techniques for contacting consumers via the one or more example consumer preference and maintenance interface servers.

FIG. 1 illustrates an example of a consumer notification system 100 in accordance with various aspects of the present disclosure. The consumer notification system 100 includes one or more consumer preference and maintenance interface servers 110, at least one entity server 116, at least one carrier information server 118, and a plurality of consumer devices 120. The one or more consumer preference and maintenance interface servers 110 may communicate with the at least one entity server 116, the at least one carrier information server 118, and the plurality of consumer devices 120 via communication links 112. In some examples, the consumer notification system 100 may be a hosted computing environment.

In some examples, the one or more consumer preference and maintenance interface servers 110 may receive consumer contact information from the at least one entity server 116. For example, the one or more consumer preference and maintenance interface servers 110 may receive a list of 10-digit phone numbers and/or consumer identification information from the at least one entity server 116. The at least one entity server 116 may also provide consumer contact instructions associated with the one or more of the 10-digit phone numbers and consumer identification information. For example, in some cases, the consumer identification information may include a predetermined date (e.g., a date and/or time in the future after the list of 10-digit phone numbers was sent) to notify the consumer. In other examples, the list of 10-digit phone numbers and/or consumer identification information may be received via physical means and entered or uploaded into the one or more consumer preference and maintenance interface servers 110. In yet other examples, the one or more consumer preference and maintenance interface servers 110 may be integrated or incorporated with a customer management system that provides the 10-digit phone numbers and/or consumer identification information.

From this consumer contact information, the one or more consumer preference and maintenance interface servers 110 receives an indication to notify a consumer. For example, the indication may be related to a consumer associated with consumer device 120*a*, which can be a mobile phone, tablet, or the like that is associated with a text-capable contact number VoIP soft phone number capable of short code texting). A text-capable number allows a device to send and receive text messages. Non-limiting examples of text-capable numbers include a wireless phone number, a VoIP soft phone number capable of short code texting, a phone number capable of short messaging service (SMS) text messaging, a phone number capable of multimedia messaging service (MMS) text and multimedia messaging. In other examples, the indication may be related to a consumer associated with consumer device 120*b*, which can be landline phone or the like that is associate with a landline phone number. A typical landline phone number, while may receive some messaging (e.g., Caller ID and Calling Name (CNAM) information), is not considered a text-capable phone number. In yet other examples, the indication may be related to a consumer associated with consumer device 120*c*, which can be a laptop computer, desktop computer, or the like. Consumer device 120*c* may have a text-capable phone number (e.g., a VoIP soft phone number capable of short code texting) or may be associated with a phone number that is not capable of sending and receiving text messages. In cases where the indication is related to a consumer associated with consumer device 120*a* or consumer device 120*c*, the contact information can include a 10-digit fax number or an email address. In accordance with certain implementations of the present disclosure, an email address can be considered a text-capable phone number. In accordance with other implementations where a confirming text is not required of the consumer device, a phone number that is capable of receiving text messages (but not capable of sending text messages) may be considered a text-capable number.

In some examples, the one or more consumer preference and maintenance interface servers 110 may identify whether a 10-digit phone number is assigned as a text-capable phone number or a landline phone number (i.e., not capable of receiving text messages). In this regard, the one or more consumer preference and maintenance interface servers 110 can utilize secondary databases of phone numbers and phone number information compiled by internal and external sources. For example, internal sources can include determinations made during the process and detection of telecommunications devices when contacting consumers. In some examples, the one or more consumer preference and maintenance interface servers 110 may detect that a phone number is a landline phone number based at least in part on certain messages (e.g., SS7-based (CNAM) lookups and/or Local Number Portability (LNP) dips) associated with establishing a call with a consumer.

Additionally or alternatively, the one or more consumer preference and maintenance interface servers 110 can perform a real-time telecommunications database dip of the 10-digit number to a database and analyzer the returned information such as the carrier that services the phone number (e.g., a carrier service code or identification identifying the service type associated with the phone number).

External sources can include, for example, information from telephone numbering administration databases that can be uses to identify a phone number as a text-capable phone number, such as a wireless phone number, or a landline phone number. For example, determine if a phone number that is not wireless number (e.g., not serviced by a wireless carrier) is actually text-capable number (e.g., by performing a dip on the number to ascertain that the carrier associated carrier and/or line is text-capable). For example, the one or more consumer preference and maintenance interface servers 110 may determine based at least in part on carrier identification information associated with a phone number is associated with a carrier entity (e.g., a Google Voice CLEC entity or the like) that is known to be capable of receiving texts in a same or similar fashion as a typical wireless phone number. For example, a VoIP soft phone may be added as an application to an existing consumer device 120*c*.

Additionally or alternatively, telecommunications industry databases can be utilized to identify whether a 10-digit phone number is assigned as a text-capable phone number or a landline phone number (i.e., not capable of receiving text messages). For example, the one or more consumer preference and maintenance interface servers 110 may analyze the first six or seven digits (e.g., NPA-NXX) of the10-digit phone number and determine whether the 10-digit phone number is a ported number. Data files (e.g., *.csv files) including phone line information including but not limited to disconnect activity may be periodically received (e.g., once a week or once a month from a telecommunications industry databases source) and loaded into the database (e.g. a local database) for access by the one or more consumer preference and maintenance interface servers 110. Thus, the one or more consumer preference and maintenance interface servers 110 can locally access the database for each 10-digit phone number to determine if it text-capable phone number and/or if there is any disconnect activity associated with the 10-digit phone number.

In some cases, the one or more consumer preference and maintenance interface servers 110 may have previously identified a text-capable contact number by requesting the consumer to enter a substitute contact number. For example, when the one or more consumer preference and maintenance interface servers 110 identifies that the 10-digit phone number for a particular consumer (identified as a primary contact number for the particular consumer) is a landline phone number (or otherwise not text capable), the one or more consumer preference and maintenance interface servers 110 may determine whether a substitute contact number is associated with the 10-digit number and that particular customer (e.g., based on a previous preference request and association of the consumer account information). If a substitute contact number is determined, the one or more consumer preference and maintenance interface servers 110 may also determine a preferred method of contact (e.g., automated voice, live voice, text, e-mail, facsimile, etc.) associated with the substitute contact number. However, if the one or more consumer preference and maintenance interface servers 110 identifies that the 10-digit phone number for the particular consumer is a new entry (e.g., as designated by the at least one entity server 116 or otherwise), the one or more consumer preference and maintenance interface servers 110 will not search for a substitute contact number, but proceed to contact the consumer via the 10-digit phone number (e.g., as the primary contact number). The one or more consumer preference and maintenance interface servers 110 may determine whether the primary contact number is a text-capable phone number. If the primary contact number is a text-capable phone number and the consumer has indicated that the consumer would like to receive text messages for future notifications and communications to that text-capable primary contact umber, the one or more consumer preference and maintenance interface servers 110 may use the primary contact number as the text-capable contact number. If the primary contact number is determined not to be a text-capable phone number, the one or more consumer preference and maintenance interface servers 110 may solicit a substitute contact number to be used as a text-capable contact number (if that is the consumer's preference for future notifications and communications).

If the one or more consumer preference and maintenance interface servers 110 identifies that there is a text-capable contact number associated with a particular customer, the one or more consumer preference and maintenance interface servers 110 may verify whether that the text-capable contact number is or remains valid. For example, the one or more consumer preference and maintenance interface servers 110 may determine a disconnect date at which the text-capable contact number was disconnected and compare the disconnect date of the text-capable contact number (if such a disconnect record is identified) with a notification date for notifying that particular consumer.

The one or more consumer preference and maintenance interface servers 110 may determine whether to notify that consumer via the text-capable contact number based at least in part on the comparison of the disconnect date with the notification date. If the one or more consumer preference and maintenance interface servers 110 determine to notify that consumer via the text-capable contact number, communications to the consumer device 120a, 120b, and/or 120c of the consumer associated with the list of 10-digit phone numbers and/or consumer identification information are provided via the text-capable contact number and preferred method.

If the one or more consumer preference and maintenance interface servers 110 determine not to notify that consumer via the text-capable contact number (e.g., when the text-capable contact number is determined to be disconnected for that particular consumer or there is no text-capable contact number associated with the 10-digit phone number or consumer), the one or more consumer preference and maintenance interface servers 110 may execute a call the 10-digit phone number (i.e., the determined landline phone number) and deliver an outbound message to consumer device 120b for that particular consumer. The one or more consumer preference and maintenance interface servers 110 may determine if a consumer answers the phone or if the call goes to an answering system (e.g., an answering recording device connected to/integrated with the consumer device 120b or a voice mail system operatively coupled to consumer device 120b). If the one or more consumer preference and maintenance interface servers 110 determine that the consumer answer the call (e.g., an on-hook message or the like indication of an active call), the one or more consumer preference and maintenance interface servers 110 call may play a pre-recorded message to solicit a substitute contact number for receiving text messages that can be used as the text-capable contact number. Additionally or alternatively, communications to the consumer device 120b of the consumer associated with the list of 10-digit phone numbers and/or consumer identification information may be provided via the 10-digit phone number (i.e., the determined landline phone number).

In some examples, the one or more consumer preference and maintenance interface servers 110 may provide an interactive option to press a defined digit on the phone keypad if the consumer would like to enter contact information for receiving future communications via text messages (or email messages, in some cases). Alternatively or additionally, the one or more consumer preference and maintenance interface servers 110 may provide a designated telephone number (e.g., toll-free or other) for the consumer to call in order to enter contact information for receiving future communications via text or email messages.

For example, if the consumer presses the defined digit, the one or more consumer preference and maintenance interface servers 110 may direct the consumer to enter a wireless phone number (or other text-capable phone number) with which to receive future messages via text or email. In some examples, the one or more consumer preference and maintenance interface servers 110 may direct the consumer to enter an email address with which to receive future email messages.

In cases where the consumer calls the designated telephone number in order to enter contact information, the one or more consumer preference and maintenance interface servers 110 will identify (e.g., via Caller ID or similar call signaling features) the calling party to identify the incoming call as being related to a particular consumer previously contacted. If the one or more consumer preference and maintenance interface servers 110 does not recognize the calling party of the incoming call, the one or more consumer preference and maintenance interface servers 110 may request that the 10-digit phone number for the consumer be entered (e.g., a recording stating: "Please enter the phone number from which you received the original message."). In this manner, if the 10-digit phone number identified or entered matches a 'phone number on file' for the consumer, the one or more consumer preference and maintenance interface servers 110 will direct the consumer to enter a wireless phone number (or other text-capable phone number) as way to 'opt-in' to receive future messages via text (or email, in some cases) via the entered substitute contact number.

It is to be understood that the substitute contact number or text-capable contact number can be a phone number or an email address (i.e., not necessarily an actual phone number). Moreover, the 'phone number on file' can be any phone number or contact information that has been determined or provided by an entity via any type of communication (e.g., written, spoken, electronic, etc.) through the course of the entity's business dealings with the consumer, for example.

Accordingly, the one or more consumer preference and maintenance interface servers 110 can obtain a text-capable contact number associated with the consumer by providing the interactive option, the designated telephone number for the consumer to call back, or similar processes for the consumer to enter a substitute contact number (e.g., a web-based substitute contact number interface) that can be used as the text-capable contact number. The one or more consumer preference and maintenance interface servers 110 may save (e.g., electronically and/or in a physical document) the text-capable contact number that the consumer enters as the preferred contact number or substitute contact number.

If the one or more consumer preference and maintenance interface servers 110 determine that the call has been routed to the answering system, the one or more consumer preference and maintenance interface servers 110 may provide a message with a designated telephone number for the consumer to call in order to enter contact information for receiving future communications via text or email messages. Communications associated with the list of 10-digit phone numbers and/or consumer identification information may also be provided to the answering system of consumer device 120*b*. If, however, the communications relate to sensitive, private, and/or confidential information, the one or more consumer preference and maintenance interface servers 110 may determine not to provide the communication to the answering system of consumer device 120*b*.

In cases when the one or more consumer preference and maintenance interface servers 110 identifies that the 10-digit phone number for a particular consumer (e.g., the primary contact number) is a text-capable phone number, the one or more consumer preference and maintenance interface servers 110 may determine whether or request whether the consumer wishes to use that 10-digit phone number to receive text messages for future notifications or communications. Additionally or alternatively, the one or more consumer preference and maintenance interface servers 110 may determine that the consumer has previously indicated to use that 10-digit phone number (e.g., the primary contact number) to receive text messages for future notifications or communications, and thus proceed with using the 10-digit phone number as the text-capable contact number for sending the future notifications or communications. If a text-capable contact number is determined, the one or more consumer preference and maintenance interface servers 110 may also determine a preferred method of contact (e.g., automated voice, live voice, text, e-mail, facsimile, etc.) associated with the text-capable contact number as a substitute contact number for the consumer.

Thus, it is to be understood that, in some cases, the 10-digit number (e.g., the primary contact number determined as a text-capable phone number) may be the text-capable contact number (and preferred contact number) via which the consumer receives future messages via text (or email, in some cases). However, if the one or more consumer preference and maintenance interface servers 110 identifies that the 10-digit phone number for the particular consumer is a new entry (e.g., as designated by the at least one entity server 116 or otherwise), the one or more consumer preference and maintenance interface servers 110 may not necessarily search for a substitute contact number (to be used as the text-capable contact number), but proceed to contact the consumer via that 10-digit phone number (e.g., the initial or new primary contact number associated with that consumer).

If the one or more consumer preference and maintenance interface servers 110 identifies that there is a text-capable contact number associated with the 10-digit number and that particular customer, the one or more consumer preference and maintenance interface servers 110 may verify whether that the text-capable contact number is or remains valid. For example, the one or more consumer preference and maintenance interface servers 110 may determine a disconnect date at which the text-capable contact number was disconnected and compare the disconnect date of the text-capable contact number (if such a disconnect record is identified) with a notification date for notifying that particular consumer.

The one or more consumer preference and maintenance interface servers 110 may determine whether to notify that consumer via the text-capable contact number based at least in part on the comparison of the disconnect date with the notification date. If the one or more consumer preference and maintenance interface servers 110 determine to notify that consumer via the text-capable contact number, communications to the consumer device 120*a*, 120*b*, and/or 120*c* of the consumer associated with the list of 10-digit phone numbers and/or consumer identification information are provided via the text-capable contact number and preferred method.

If the one or more consumer preference and maintenance interface servers 110 determine not to notify that consumer via the text-capable contact number (e.g., when the text-capable contact number is determined to be disconnected for that particular consumer or there is no text-capable contact number associated with the 10-digit phone number or consumer), the one or more consumer preference and maintenance interface servers 110 may execute a call the 10-digit phone number (e.g., the primary contact number) and deliver an outbound message to consumer device 120*a* for that particular consumer (e.g., if the 10-digit phone number or the primary contact number is not the text-capable phone number). The one or more consumer preference and maintenance interface servers 110 may determine if a consumer answers the phone or if the call goes to an answering system (e.g., a voice mail system operatively coupled to consumer device 120*a*).

If the one or more consumer preference and maintenance interface servers 110 determine that the consumer answer the call (e.g., an on-hook message or the like indication of an active call), the one or more consumer preference and maintenance interface servers 110 call may play a pre-recorded message to solicit a substitute contact number to be used as the text-capable contact number. Communications to the consumer device 120*a* of the consumer associated with the list of 10-digit phone numbers and/or consumer identification information may also be provided via the 10-digit phone number (e.g., when the10-digit phone number or primary contact number is determined to be a text-capable phone number).

In some examples, the one or more consumer preference and maintenance interface servers 110 may provide an interactive option to press a first defined digit on the phone keypad if the consumer would like to receive future communications via text or email messages to the 10-digit phone number (e.g., the primary contact number is determined to be a text-capable phone number). Alternatively or additionally, the one or more consumer preference and maintenance interface servers 110 may provide an interactive option to press a second defined digit on the phone keypad if the consumer would like to enter contact information for receiving future communications via text messages (e.g., if the primary contact number is determined not to be a text-capable phone number, and the consumer wishes to enter a substitute contact number as the text-capable contact number for receiving future communications via text messages). Alternatively or additionally, the one or more consumer preference and maintenance interface servers 110 may provide a designated telephone number (e.g., toll-free or other) for the consumer to call in order to enter contact information for receiving future communications via text or email messages.

If the one or more consumer preference and maintenance interface servers 110 detects that the consumer has pressed or selected the first defined digit, the one or more consumer preference and maintenance interface servers 110 will assign the 10-digit phone number (e.g., the primary contact number is determined to be a text-capable phone number) as the text-capable contact number and will provide future messages via text to the text-capable contact number. If the consumer presses the second defined digit, the one or more consumer preference and maintenance interface servers 110 may direct the consumer to enter a wireless or other text-capable phone number (e.g., which can be different from the 10-digit phone number/primary contact number) with which to receive future messages via text. In some examples, the one or more consumer preference and maintenance interface servers 110 may direct the consumer to enter an email address with which to receive future email messages.

In cases when the consumer calls the designated telephone number in order to enter contact information, the one or more consumer preference and maintenance interface servers 110 will identify (e.g., via Caller ID or similar call signaling features) or request the 10-digit phone number for the consumer. In this manner, if the 10-digit phone number identified or entered matches a 'phone number on file' for the consumer, the one or more consumer preference and maintenance interface servers 110 will direct the consumer to enter a text-capable phone number (or email) address as a way to 'opt-in' to receive future messages via text (or email) via the entered text-capable contact number.

If the one or more consumer preference and maintenance interface servers 110 determine that the call has been routed to the answering system of consumer device 120a, the one or more consumer preference and maintenance interface servers 110 may provide a message with a designated telephone number for the consumer to call in order to enter contact information for receiving future communications via text messages.

Communications associated with the list of 10-digit phone numbers and/or consumer identification information may also be provided to the answering system of the consumer device 120a.

If the consumer calls the designated telephone number, the one or more consumer preference and maintenance interface servers 110 may identify or request the 10-digit phone number for the consumer. In this manner, if the 10-digit phone number identified or entered matches a 'phone number on file' for the consumer, the one or more consumer preference and maintenance interface servers 110 will direct the consumer to enter a text-capable phone number as a way to 'opt-in' to receive future messages via text via the entered text-capable contact number as a substitute contact number.

As described in the examples herein, when the one or more consumer preference and maintenance interface servers 110 determine to utilize a text-capable contact number, the one or more consumer preference and maintenance interface servers 110 may verify whether the text-capable contact number is or remains valid before executing a call or text message to that particular text-capable contact number. Additionally or alternatively, in some implementations, the one or more consumer preference and maintenance interface servers 110 may verify whether the 10-digit phone number or remains valid before executing a call or text message to that particular 10-digit phone number whether it is a landline phone number (and not text-capable) or a wireless phone number (and is text capable).

In this regard, the one or more consumer preference and maintenance interface servers 110 may verify the contact information (e.g., the text-capable contact number as a substitute contact number and/or the 10-digit phone number/primary contact number) has a high propensity to belong to the associated consumer (e.g., the consumer who entered the substitute contact number and preferred method of contact). It is to be understood that, in some examples, the time that the consumer enters the substitute contact number to be used as the text-capable contact number may be many months after the time when the consumer is to be contacted or notified (e.g., the communications associated with and prompted by the received list of 10-digit phone numbers and/or consumer identification information).

For example, if the 10-digit phone number is a landline phone number, the one or more consumer preference and maintenance interface servers 110 may determine the landline phone number to be invalid if call attempts failed 'x' times during 'y' days. In some implementations, the one or more consumer preference and maintenance interface servers 110 may determine the landline number to be invalid if call attempts failed three times during five days. In this manner, the one or more consumer preference and maintenance interface servers 110 can avoid designating the landline number as invalid due to service outages or other network-related problems not associated with whether the landline number is assigned to the consumer. A similar technique based at least in part on successful and unsuccessful call attempts over a time period can be used when the 10-digit phone number is determined to be a text-capable phone number. It is to be understood that other variables for call attempts and days associated with this validation technique can be used given the context of the communication type to be provided to the consumers.

In some examples, if the substitute contact number or the 10-digit phone number is a text-capable phone number, the one or more consumer preference and maintenance interface servers 110 may determine the text-capable contact number to be invalid if the text-capable contact number has been determined to be disconnected based at least in part on the disconnect information received via the at least one carrier information server 118. The at least one carrier information server 118 may aggregate a list of all disconnected wireless numbers provided by participating wireless carriers. The disconnected wireless numbers may be provide on the date or soon after the date that the wireless numbers are disconnected.

Thus, in some examples, when the one or more consumer preference and maintenance interface servers 110 process each 10-digit phone number associated with the list of 10-digit phone numbers and/or consumer identification information received via the at least one entity server 116 to make a notification, the one or more consumer preference and maintenance interface servers 110 compare (in real time) the text-capable contact number (either the substitute contact number or the 10-digit phone number) to the aggregated list of disconnected wireless numbers (which may include other disconnected text-capable phone numbers) received via the at least one carrier information server 118. If the one or more consumer preference and maintenance interface servers 110 detect a match between the text-capable contact number and the aggregated list of disconnected wireless numbers, that particular text-capable contact number may be determined as invalid (or may be determined as valid, for example, if the disconnect date associated with the text-capable contact number is not deemed to be recent as compared to a date that the consumer entered the substitute contact number).

It is to be appreciated that, in some examples, only the phone number and disconnect date data elements are utilized to determine whether disconnect activity has occurred with respect to that particular text-capable contact number, and thus a quicker execution can be performed for determining whether the text-capable contact number is an active number as compared to checking and verifying consumer name and address information to determine if the disconnect activity is related to the consumer's account. In this regard, many minor data entry inconsistencies (e.g., that may be required for billing verification, service delivery, or other purposes)

do not generate false positives indications of disconnect activity as compared to the consumer's account as understood by the one or more consumer preference and maintenance interface servers 110. Additionally, the one or more consumer preference and maintenance interface servers 110 need not use computing resources to process such additional data elements (which can be significant for large list of 10-digit phone numbers and associated consumer contact campaigns) to determine whether the text-capable contact number is active and valid for communications to that consumer. Moreover, additional software or a specialized application is not required to be installed on the consumer devices 120a, 120b, 120c for the consumer notification system 100 to operate as discussed herein.

It is to be understood that, in other examples, the one or more consumer preference and maintenance interface servers 110 may process each of the 10-digit phone number associated with the list of 10-digit phone numbers and/or consumer identification information received via the at least one entity server 116 in a batch verification process before the attempt to make a notification to each of the associated consumers. Additionally, in accordance with some aspects, any substitute contact numbers or 10-digit phone numbers determined by the one or more consumer preference and maintenance interface servers 110 to be invalid may be reported back to the entity wishing to notify the consumers (e.g., transmit the invalid 10-digit phone numbers to the at least one entity server 116 via communication link 112). Similarly, when a consumer elects to change the 10-digit phone number that was provided in the list of 10-digit phone numbers and/or consumer identification information from the entity to a substitute contact number or text-capable contact number based on an opt-in process associated with the primary contact number, the one or more consumer preference and maintenance interface servers 110 may reported the consumer preference changes back to the entity wishing to notify the consumers (e.g., transmit the consumer preference changes to the at least one entity server 116 via communication link 112).

Figure 2:
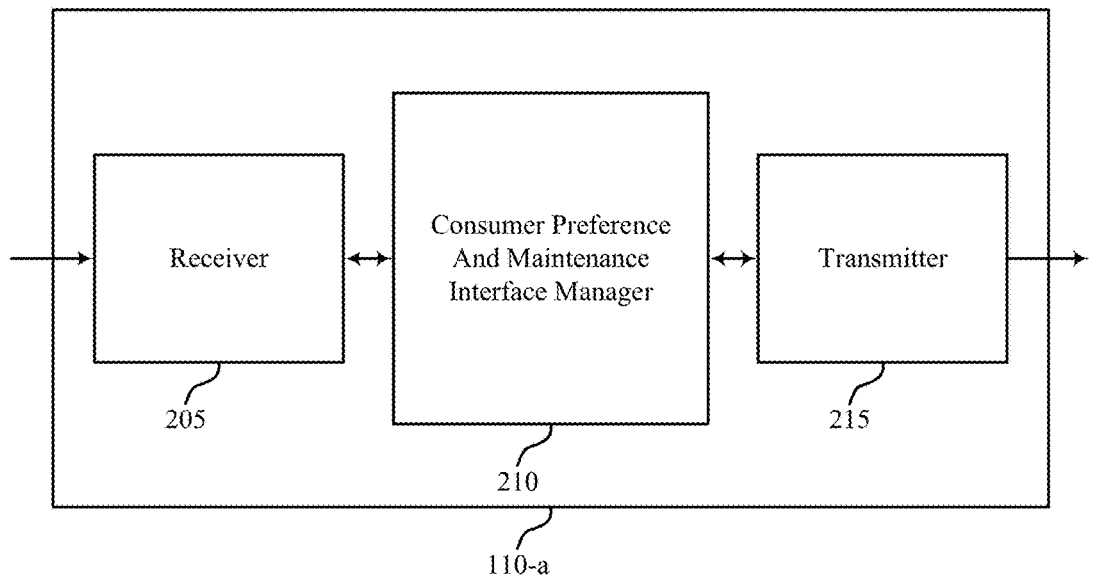
FIGS. 2 through 4 show block diagrams of examples of consumer preference and maintenance interface servers in accordance with aspects of the present disclosure.

FIG. 2 shows a block diagram of an example of a consumer preference and maintenance interface server 110-a in accordance with various aspects of the present disclosure. Consumer preference and maintenance interface server 110-a may be an example of aspects of the consumer preference and maintenance interface servers 110 described with reference to FIG. 1. Consumer preference and maintenance interface server 110-a may include receiver 205, consumer preference and maintenance interface manager 210 and transmitter 215. Consumer preference and maintenance interface server 110-a may also include a processor. Each of these components may be in communication with each other.

The receiver 205 may receive information such as packets, data, or control information associated with various information channels. Information may be passed on to other components of the consumer preference and maintenance interface server 110-a. The receiver 205 may receive information from other systems, servers, and devices such as, but not limited to, the at least one entity server 116, the at least one carrier information server 118, and the plurality of consumer devices 120 described with reference to FIG. 1.

The consumer preference and maintenance interface manager 210 may receive an indication to notify a consumer, identifying a text-capable contact number associated with the consumer, determine a disconnect date at which the text-capable contact number was disconnected, compare the disconnect date with a notification date associated with receiving the indication to notify the consumer, and determine whether to notify the consumer via the text-capable contact number based on the comparison of the disconnect date with the notification date.

The consumer preference and maintenance interface manager 210 may receive an indication to notify a consumer, identifying whether a primary contact number for which to notify the consumer is a text-capable phone number, place an outbound call to the primary contact number based at least in part on receiving the indication to notify the consumer, determine whether the outbound call to the primary contact number is answered by a person, and provide a future communications message and a prompt to allow the consumer to enter a substitute contact number for receiving future communications via text messages, when the primary contact number is not identified as a text-capable phone number and the outbound call is determined to be answered by a person.

The consumer preference and maintenance interface manager 210 may receive an indication to notify a consumer, identify whether a primary contact number for which to notify the consumer is a text-capable phone number, place an outbound call to the primary contact number based at least in part on receiving the indication to notify the consumer, determine that the outbound call to the primary contact number is answered by an answering system, provide a callback message that includes a designated telephone number for the consumer to call, receive an incoming call on the designated telephone number, and determine whether the incoming call is associated with identifiable consumer identification information.

The transmitter 215 may transmit signals received from other components of the consumer preference and maintenance interface server 110-a (e.g., for communicating with other servers or consumer devices). The transmitter 215 may transmit signals to other systems, servers, and devices such as, but not limited to, the at least one entity server 116, the at least one carrier information server 118, and the plurality of consumer devices 120 described with reference to FIG. 1. In some examples, the transmitter 215 may be collocated with the receiver 205 in a transceiver module. The transmitter 215 and receiver 205 may include one or more network links or interfaces.

Figure 3:
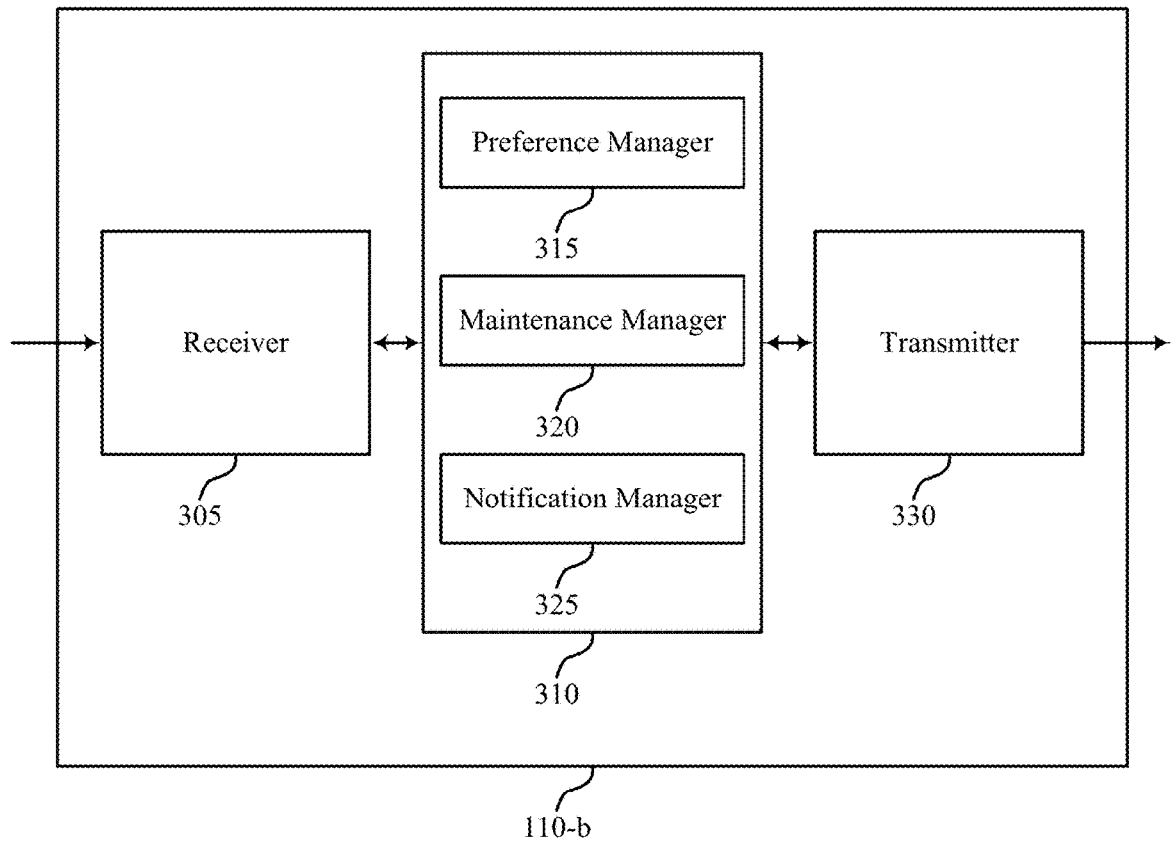

FIG. 3 shows a block diagram of an example of a consumer preference and maintenance interface server 110-b in accordance with various aspects of the present disclosure. Consumer preference and maintenance interface server 110-b may be an example of aspects of consumer preference and maintenance interface server 110-a or the one or more consumer preference and maintenance interface servers 110 as described with reference to FIGS. 1 and 2. Consumer preference and maintenance interface server 110-b may include receiver 305, consumer preference and maintenance interface manager 310, and transmitter 330. Consumer preference and maintenance interface manager 110-b may also include a processor. Each of these components may be in communication with each other.

The receiver 305 may receive information which may be passed on to other components of the consumer preference and maintenance interface server 110-b. The receiver 305 may also perform the functions described with reference to the receiver 205 of FIG. 2. The receiver 205 may receive information from other systems, servers, and devices such as, but not limited to, the at least one entity server 116, the at least one carrier information server 118, and the plurality of consumer devices 120 described with reference to FIG. 1.

The consumer preference and maintenance interface manager 310 may be an example of aspects of consumer preference and maintenance interface manager 205 described with reference to FIG. 2. In some examples, the consumer preference and maintenance interface manager 310 may include preference manager 315, maintenance manager 320, and notification manager 325.

The preference manager 315 may identify a text-capable contact number associated with the consumer, determine whether to notify the consumer via the text-capable contact number based on the comparison of the disconnect date with the notification date, determine to notify the consumer based on the disconnect date being a first time duration before the notification date, determine not to notify the consumer based on the disconnect date being a second time duration before the notification date. The preference manager 315 may also reference the primary contact number of the consumer and determine that the primary contact number is a phone number capable of receiving text messages. The preference manager 315 may also reference the primary contact number of the consumer, determine that the primary contact number is not a phone number capable of receiving text messages, and receiving the text-capable contact number as a substitute contact number for the consumer based at least in part on an opt-in process associated with the primary contact number. The preference manager 315 may also determine not to notify the consumer based on the comparison of the disconnect date with the notification date and determine to notify the consumer via the primary contact number.

The maintenance manager 320 may determine a disconnect date at which the text-capable contact number was disconnected and compare the disconnect date with a notification date associated with receiving the indication to notify the consumer. The maintenance manager 320 may also determine an established connect date for the text-capable contact number based on one or more successful notification attempts made to the text-capable contact number and determine to notify the consumer based on the disconnect date being before the established connect date for the text-capable contact number. The maintenance manager 320 may also receive disconnect information for a plurality of numbers.

The notification manager 325 may receive an indication to notify a consumer. In some cases, the indication to notify the consumer corresponds to a primary contact number of the consumer. In some cases, the notification date is associated with receipt of the indication to notify the consumer. In other cases, the notification date is associated with a predetermined date to notify the consumer.

The transmitter 330 may transmit signals received from other components of the consumer preference and maintenance interface server 110-b. In some examples, the transmitter 330 may be collocated with receiver 305 in a transceiver module. The transmitter 330 and receiver 315 may include one or more network links or interfaces.

Figure 4:
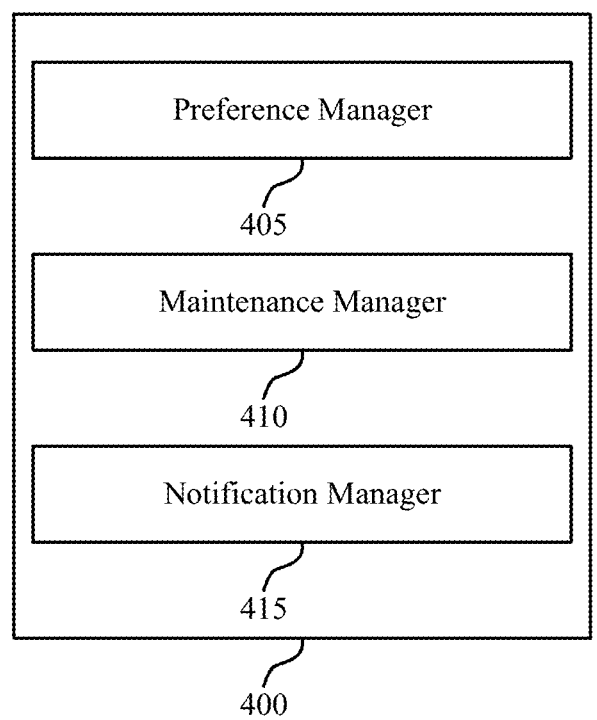

FIG. 4 shows a block diagram of an example of a consumer preference and maintenance interface manager 400 which may be an example of the corresponding component of consumer preference and maintenance interface server 110-a or consumer preference and maintenance interface server 110-b. That is, consumer preference and maintenance interface manager 400 may be an example of aspects of consumer preference and maintenance interface manager 210 or consumer preference and maintenance interface manager 310 described with reference to FIGS. 2 and 3. The consumer preference and maintenance interface manager 400 may also be an example of aspects of the consumer preference and maintenance interface manager 505 described with reference to FIG. 5.

The consumer preference and maintenance interface manager 400 may include preference manager 405, maintenance manager 410, and notification manager 415. Each of these modules may communicate, directly or indirectly, with one another (e.g., via one or more buses).

The preference manager 405 may identify a text-capable contact number associated with the consumer, determine whether to notify the consumer via the text-capable contact number based on the comparison of the disconnect date with the notification date, determine to notify the consumer based on the disconnect date being a first time duration before the notification date, determine not to notify the consumer based on the disconnect date being a second time duration before the notification date. The preference manager 405 may also reference the primary contact number of the consumer and determine that the primary contact number is a phone number capable of receiving text messages. The preference manager 405 may also reference the primary contact number of the consumer, determine that the primary contact number is not a phone number capable of receiving text messages, and receiving the text-capable contact number as a substitute contact number for the consumer based at least in part on an opt-in process associated with the primary contact number. The preference manager 405 may also determine not to notify the consumer based on the comparison of the disconnect date with the notification date and determine to notify the consumer via the primary contact number.

The maintenance manager 410 may determine a disconnect date at which the text-capable contact number was disconnected and compare the disconnect date with a notification date associated with receiving the indication to notify the consumer. The maintenance manager 410 may also determine an established connect date for the text-capable contact number based on one or more successful notification attempts made to the text-capable contact number and determine to notify the consumer based on the disconnect date being before the established connect date for the text-capable contact number. The maintenance manager 410 may also receive disconnect information for a plurality of numbers.

The notification manager 415 may receive an indication to notify a consumer. In some cases, the indication to notify the consumer corresponds to a primary contact number of the consumer. In some cases, the notification date is associated with receipt of the indication to notify the consumer. In other cases, the notification date is associated with a predetermined date to notify the consumer.

Figure 5:
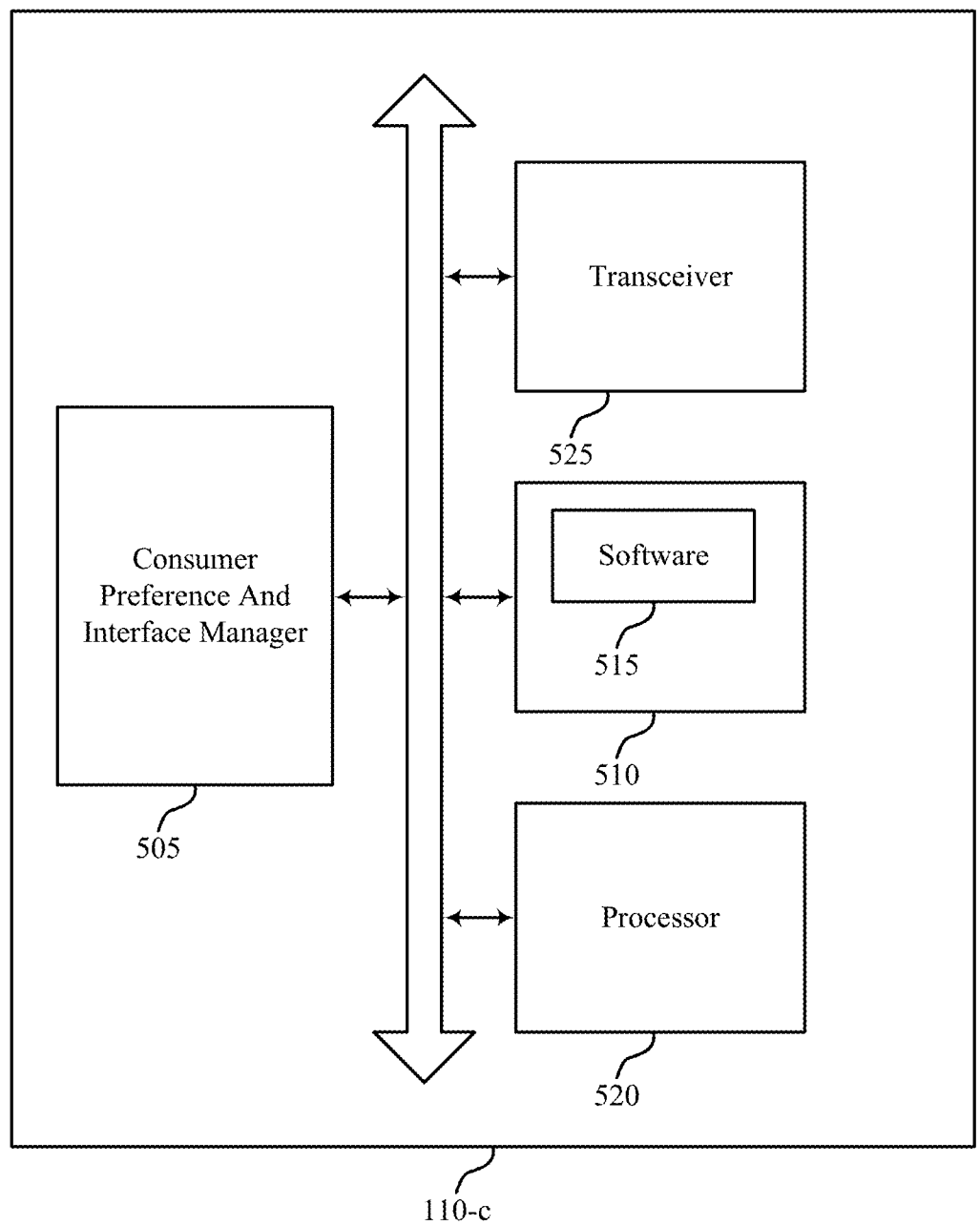
FIG. 5 illustrates a block diagram of an example of a consumer preference and maintenance interface server that supports techniques for contacting consumers in accordance with aspects of the present disclosure.

FIG. 5 illustrates a block diagram of an example of a consumer preference and maintenance interface server 110-c that supports techniques for contacting consumers in accordance with aspects of the present disclosure. For example, consumer preference and maintenance interface server 110-c may be used in a consumer notification system such as consumer notification system 100 as described with respect to FIG. 1. Consumer preference and maintenance interface server 110-c may be an example of aspects of consumer preference and maintenance interface server 110-a, consumer preference and maintenance interface server 110-b, or the one or more consumer preference and maintenance interface servers 110 as described as described with reference to FIGS. 1 through 3.

Consumer preference and maintenance interface server 110-c may also include consumer preference and maintenance interface manager 505, memory 510, processor 520, and transceiver 525. Each of these modules may communicate, directly or indirectly, with one another (e.g., via one or more buses). The consumer preference and maintenance interface manager 505 may be an example of a consumer preference and maintenance interface manager as described with reference to FIGS. 2 through 4.

The memory 510 may include random access memory (RAM) and read only memory (ROM). The memory 510 may store computer-readable, computer-executable software including instructions that, when executed, cause the processor to perform various functions described herein. In some cases, the software 515 may not be directly executable by the processor but may cause a computer (e.g., when compiled and executed) to perform functions described herein.

The processor 520 may include an intelligent hardware device, (e.g., a central processing unit (CPU), a microcontroller, an application specific integrated circuit (ASIC), etc.). The transceiver 525 may communicate bi-directionally, via one or more network links or interfaces that may be optical, electrically wired, and/or wireless, with one or more other systems, servers, devices or networks as described above. For example, the transceiver 525 may communicate bi-directionally with the at least one entity server 116 and the at least one carrier information server 118. The transceiver 525 may also communicate bi-directionally with the plurality of consumer devices 120. The transceiver 525 may also include a modem to modulate the packets and provide the modulated packets for transmission, and to demodulate packets received from the one or more network links or interfaces.

Figure 6:
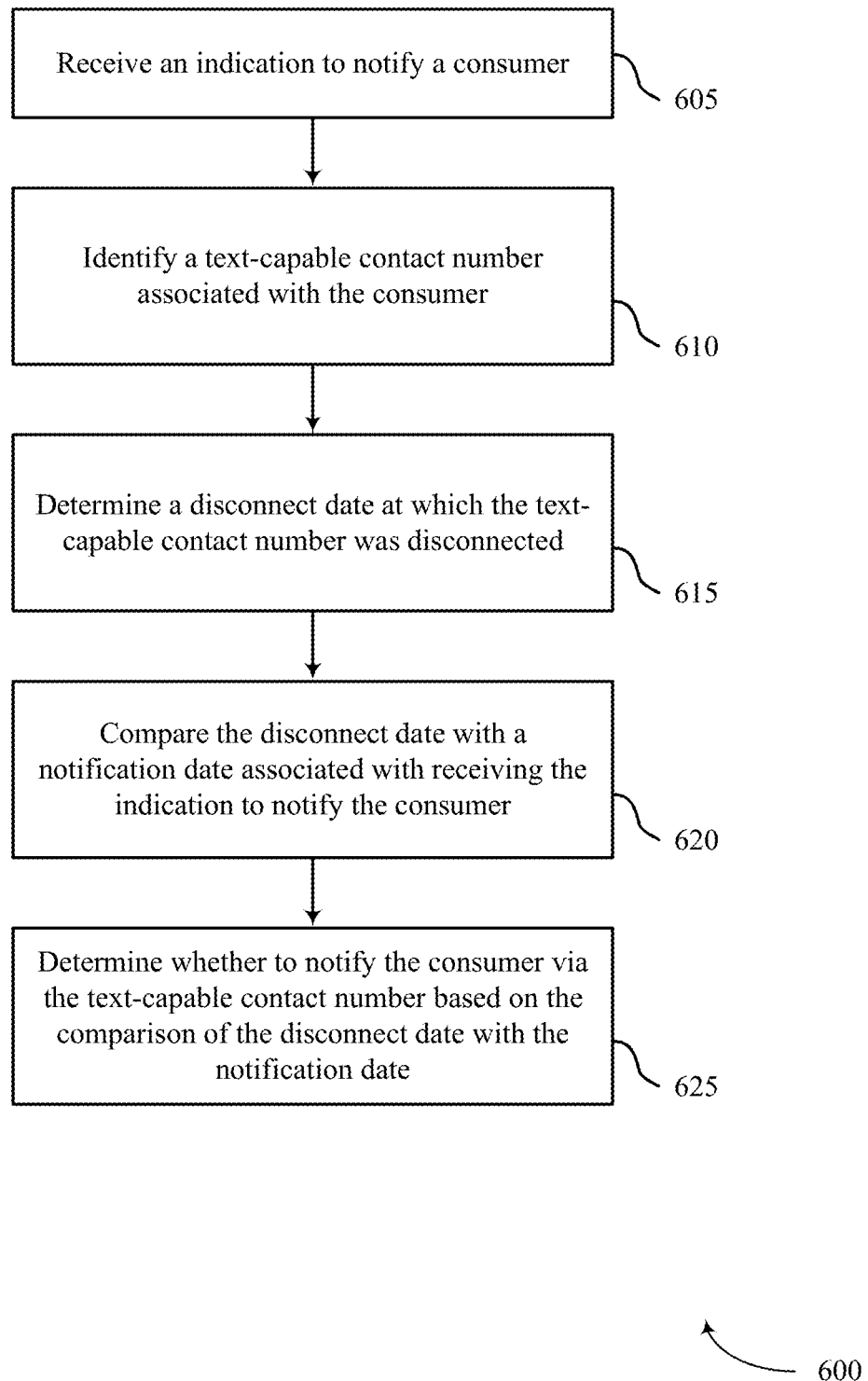
FIGS. 6 through 12 illustrate methods for contacting consumers in accordance with aspects of the present disclosure.

FIG. 6 shows a flowchart illustrating a method 600 for contacting consumers in accordance with various aspects of the present disclosure. The operations of method 600 may be implemented by a computing device (e.g., a server) such as consumer preference and maintenance interface server 110-a, consumer preference and maintenance interface server 110-b, consumer preference and maintenance interface server 110-c, or the one or more consumer preference and maintenance interface servers 110 or its components as described with reference to FIGS. 1 through 5. In some examples, the computing device may execute a set of codes to control the functional elements of the computing device to perform the functions described below. Additionally or alternatively, the computing device may perform aspects of the functions described below using special-purpose hardware.

At block 605, the computing device may receive an indication to notify a consumer as described above with reference to FIGS. 1 through 5. For example, the computing device may receive an indication to notify a particular customer from a list of 10-digit phone numbers and/or consumer identification information from an entity (e.g., a third-party provider). The indication to notify the particular customer can include information specific to that particular customer (e.g., a medicament pick-up notice from a pharmacy) or may include information that is similar for a large group of customers (e.g., a channel change notice for a communications provider). In certain examples, the operations of block 605 may be performed by the notification manager as described with reference to FIGS. 3 and 4.

At block 610, the computing device may identify a text-capable contact number associated with the consumer as described above with reference to FIGS. 1 through 5. For example, the computing device may reference information associated with the consumer such that the text-capable contact number is associated with a preferred contact number and preferred communication method (e.g., a wireless phone number via text messages, an email address via emails, etc.). This text-capable contact number as a preferred contact number for future communications may be identified by the consumer as a substitute contact number and can be different from a primary number (e.g., a home landline phone number or an office wireline phone number) associated with the consumer's account, for example. In some cases, the primary number is capable of receiving text messages and may be designated by the consumer as the text-capable contact number for receiving future communications via text. Thus, the computing device may determine to use the text-capable contact number to notify the consumer. In certain examples, the operations of block 610 may be performed by the preference manager as described with reference to FIGS. 3 and 4.

At block 615, the computing device may determine a disconnect date at which the text-capable contact number was disconnected as described above with reference to FIGS. 1 through 5. In this regard, the computing device may access a list of disconnected numbers compiled from external sources (e.g., as provided by certain wireless carriers and received by the computing device) and determinations based at least in part on failed call attempts previously made to the text-capable contact number. In certain examples, the operations of block 615 may be performed by the maintenance manager as described with reference to FIGS. 3 and 4.

At block 620, the computing device may compare the disconnect date with a notification date associated with receiving the indication to notify the consumer as described above with reference to FIGS. 1 through 5. By comparing the disconnect date associated with the text-capable contact number with the notification date associated with receiving the indication to notify the consumer (e.g., the date at which the list of 10-digit phone numbers and/or consumer identification information was received), the computing device can make a determination as to whether the disconnect information can be attributed to the current owner of the text-capable contact number (i.e., the consumer that identified the text-capable contact number as a preferred contact number) or a previous owner of the phone number (or email address, in some cases) that constitutes the text-capable contact number. In certain examples, the operations of block 620 may be performed by the maintenance manager as described with reference to FIGS. 3 and 4.

At block 625, the computing device may determine whether to notify the consumer via the text-capable contact number based on the comparison of the disconnect date with the notification date as described above with reference to FIGS. 1 through 5. In this manner, if the computing device determines that there is a high probability that the text-capable contact number has been disconnected (and may be currently unassigned or assigned to a new owner), the computing device will not attempt to contact the consumer via the text-capable contact number. If, however, the computing device determines that there is a high probability that the disconnect information associated with the text-capable contact number is not attributed to the consumer as the current owner of the text-capable contact number, the computing device will attempt to contact the consumer via the text-capable contact number.

In certain examples, the operations of block 625 may be performed by the preference manager as described with reference to FIGS. 3 and 4.

Figure 7:
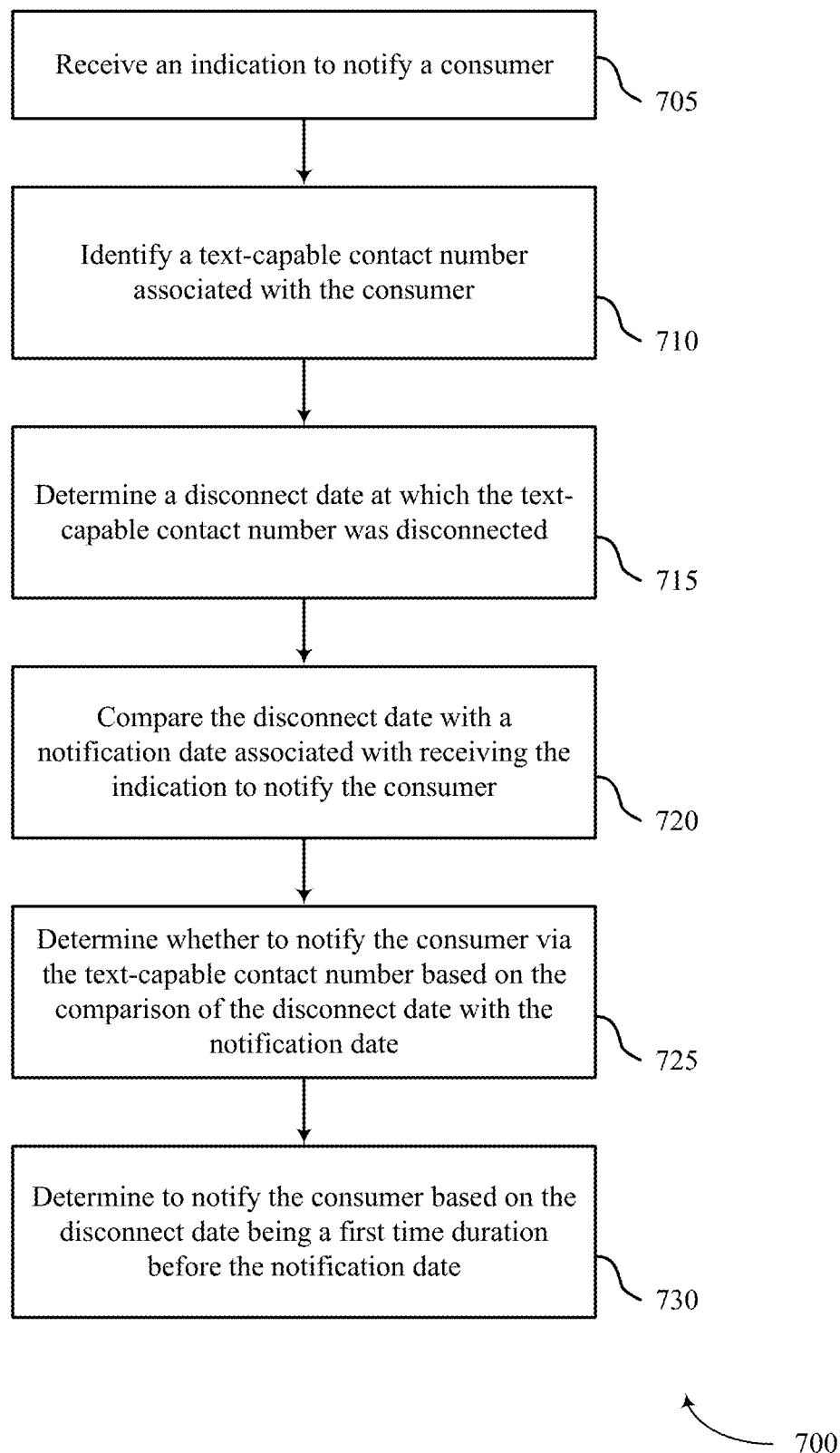

FIG. 7 shows a flowchart illustrating a method 700 for contacting consumers in accordance with various aspects of the present disclosure. The operations of method 700 may be implemented by a computing device (e.g., a server) such as consumer preference and maintenance interface server 110-

*a*, consumer preference and maintenance interface server 110-*b*, consumer preference and maintenance interface server 110-*c*, or the one or more consumer preference and maintenance interface servers 110 or its components as described with reference to FIGS. 1 through 5. In some examples, the computing device may execute a set of codes to control the functional elements of the computing device to perform the functions described below. Additionally or alternatively, the computing device may perform aspects the functions described below using special-purpose hardware.

At block 705, the computing device may receive an indication to notify a consumer as described above with reference to FIGS. 1 through 6. In certain examples, the operations of block 705 may be performed by the notification manager as described with reference to FIGS. 3 and 4.

At block 710, the computing device may identify a text-capable contact number associated with the consumer as described above with reference to FIGS. 1 through 6. In certain examples, the operations of block 710 may be performed by the preference manager as described with reference to FIGS. 3 and 4.

At block 715, the computing device may determine a disconnect date at which the text-capable contact number was disconnected as described above with reference to FIGS. 1 through 6. In certain examples, the operations of block 715 may be performed by the maintenance manager as described with reference to FIGS. 3 and 4.

At block 720, the computing device may compare the disconnect date with a notification date associated with receiving the indication to notify the consumer as described above with reference to FIGS. 1 through 6. In certain examples, the operations of block 720 may be performed by the maintenance manager as described with reference to FIGS. 3 and 4.

At block 725, the computing device may determine whether to notify the consumer via the text-capable contact number based on the comparison of the disconnect date with the notification date as described above with reference to FIGS. 1 through 6. In certain examples, the operations of block 725 may be performed by the preference manager as described with reference to FIGS. 3 and 4.

At block 730, the computing device may determine to notify the consumer based on the disconnect date being a first time duration before the notification date as described above with reference to FIGS. 1 through 6. For example, the first time duration (e.g., a predetermined time duration or a time duration determined based on various factors associated with the consumer notification) may be a time period of nine months in some implementations. The computing device may determine to contact the consumer via the text-capable contact number making a determination that the disconnect date for the text-capable contact number is associated with disconnect activity related to a different user (e.g., a previous user or owner of the text-capable contact number) than that of the consumer that the entity wishes to notify or contact. In certain examples, the operations of block 730 may be performed by the preference manager as described with reference to FIGS. 3 and 4.

Figure 8:
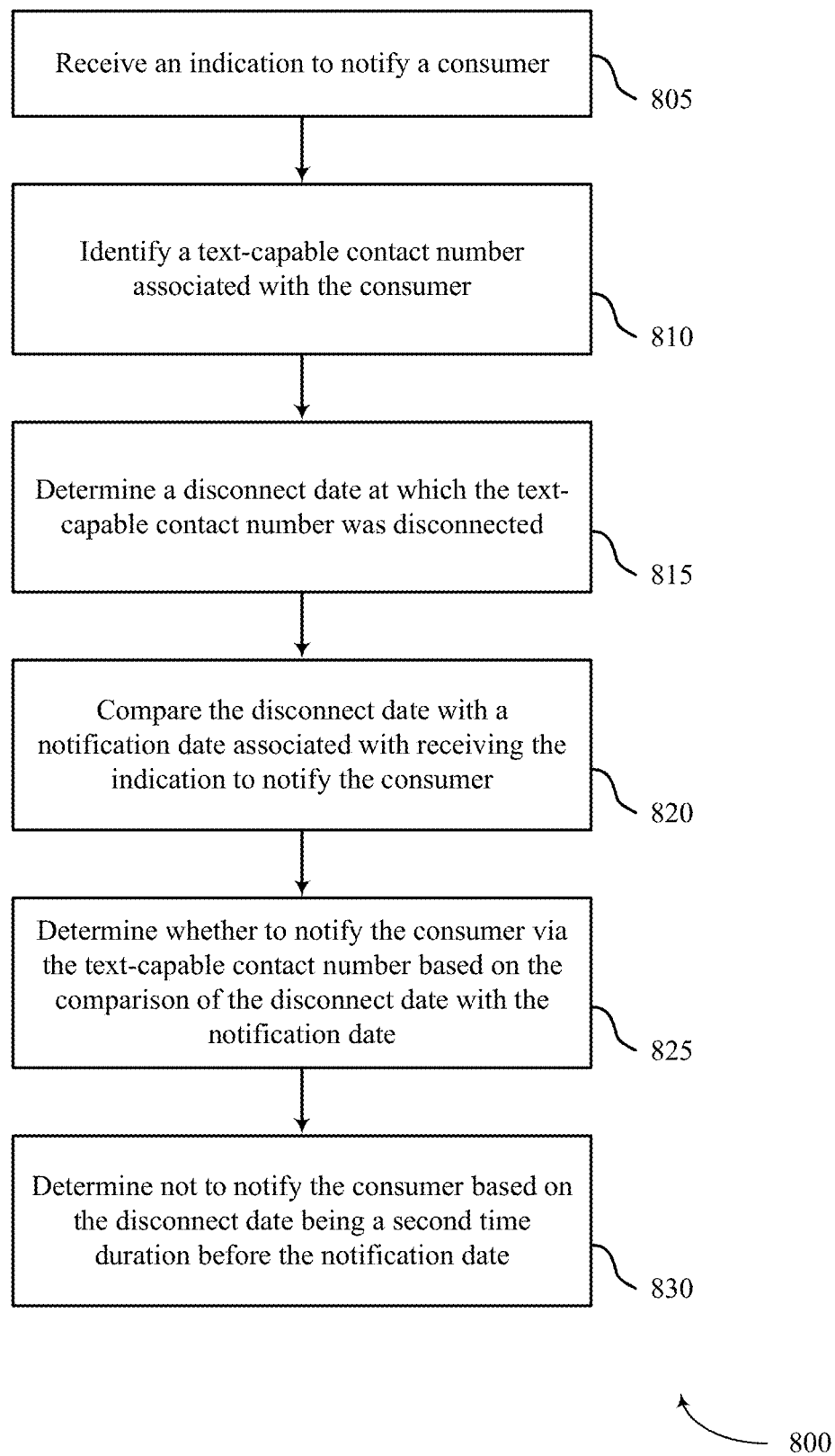

FIG. 8 shows a flowchart illustrating a method 800 for contacting consumers in accordance with various aspects of the present disclosure. The operations of method 800 may be implemented by a computing device (e.g., a server) such as consumer preference and maintenance interface server 110-*a*, consumer preference and maintenance interface server 110-*b*, consumer preference and maintenance interface server 110-*c*, or the one or more consumer preference and maintenance interface servers 110 or its components as described with reference to FIGS. 1 through 5. In some examples, the computing device may execute a set of codes to control the functional elements of the computing device to perform the functions described below. Additionally or alternatively, the computing device may perform aspects the functions described below using special-purpose hardware.

At block 805, the computing device may receive an indication to notify a consumer as described above with reference to FIGS. 1 through 7. In certain examples, the operations of block 805 may be performed by the notification manager as described with reference to FIGS. 3 and 4.

At block 810, the computing device may identify a text-capable contact number associated with the consumer as described above with reference to FIGS. 1 through 7. In certain examples, the operations of block 810 may be performed by the preference manager as described with reference to FIGS. 3 and 4.

At block 815, the computing device may determine a disconnect date at which the text-capable contact number was disconnected as described above with reference to FIGS. 1 through 7. In certain examples, the operations of block 815 may be performed by the maintenance manager as described with reference to FIGS. 3 and 4.

At block 820, the computing device may compare the disconnect date with a notification date associated with receiving the indication to notify the consumer as described above with reference to FIGS. 1 through 7. In certain examples, the operations of block 820 may be performed by the maintenance manager as described with reference to FIGS. 3 and 4.

At block 825, the computing device may determine whether to notify the consumer via the text-capable contact number based on the comparison of the disconnect date with the notification date as described above with reference to FIGS. 1 through 7. In certain examples, the operations of block 825 may be performed by the preference manager as described with reference to FIGS. 3 and 4.

At block 830, the computing device may determine not to notify the consumer based on the disconnect date being a second time duration before the notification date as described above with reference to FIGS. 1 through 7. For example, the second time duration (e.g., a predetermined time duration or a time duration determined based on various factors associated with the consumer notification) may be a time period of three months in some implementations. The computing device may determine not to contact the consumer via the text-capable contact number making a determination that the disconnect date for the text-capable contact number is associated with disconnect activity related to the consumer that the entity wishes to notify or contact. In certain examples, the operations of block 830 may be performed by the preference manager as described with reference to FIGS. 3 and 4.

Figure 9:
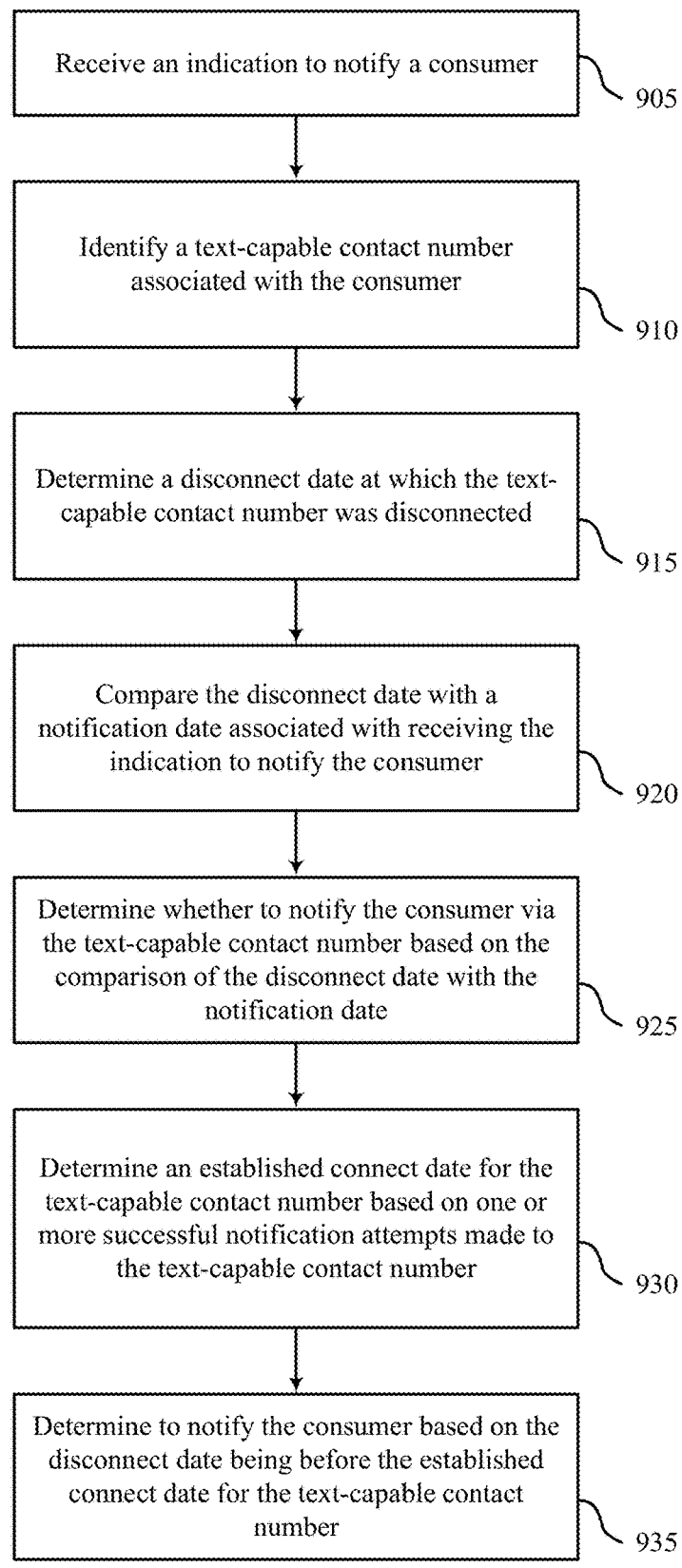

FIG. 9 shows a flowchart illustrating a method 900 for contacting consumers in accordance with various aspects of the present disclosure. The operations of method 900 may be implemented by a computing device (e.g., a server) such as consumer preference and maintenance interface server 110-*a*, consumer preference and maintenance interface server 110-*b*, consumer preference and maintenance interface server 110-*c*, or the one or more consumer preference and maintenance interface servers 110 or its components as described with reference to FIGS. 1 through 5. In some examples, the computing device may execute a set of codes to control the functional elements of the computing device to perform the functions described below. Additionally or alternatively, the computing device may perform aspects the functions described below using special-purpose hardware.

At block 905, the computing device may receive an indication to notify a consumer as described above with reference to FIGS. 1 through 8. In certain examples, the operations of block 905 may be performed by the notification manager as described with reference to FIGS. 3 and 4.

At block 910, the computing device may identify a text-capable contact number associated with the consumer as described above with reference to FIGS. 1 through 8. In certain examples, the operations of block 910 may be performed by the preference manager as described with reference to FIGS. 3 and 4.

At block 915, the computing device may determine a disconnect date at which the text-capable contact number was disconnected as described above with reference to FIGS. 1 through 8. In certain examples, the operations of block 915 may be performed by the maintenance manager as described with reference to FIGS. 3 and 4.

At block 920, the computing device may compare the disconnect date with a notification date associated with receiving the indication to notify the consumer as described above with reference to FIGS. 1 through 8. In certain examples, the operations of block 920 may be performed by the maintenance manager as described with reference to FIGS. 3 and 4.

At block 925, the computing device may determine whether to notify the consumer via the text-capable contact number based on the comparison of the disconnect date with the notification date as described above with reference to FIGS. 1 through 8. In certain examples, the operations of block 925 may be performed by the preference manager as described with reference to FIGS. 3 and 4.

At block 930, the computing device may determine an established connect date for the text-capable contact number based on one or more successful notification attempts made to the text-capable contact number as described above with reference to FIGS. 1 through 8. For example, the computing device may determine that, in some cases, a time period of five months between the disconnect date and the notification date results in approximately an equal probability that the disconnect activity associated with the disconnect date can be attributed to the consumer. Additionally or alternatively, there may be other uncertainties related to disconnect activity associated with the disconnect date (e.g., a temporary disconnect of the text-capable contact number based on bill nonpayment that was quickly remedied such that the consumer retains the text-capable contact number). The computing device may allow a limited number of notification attempts to determine if the text-capable contact number is currently owned by or assigned to the consumer that the entity wishes to notify or contact. If one or more successful notification attempts made to the text-capable contact number, the computing device may determine the established connect date for the text-capable contact number. In this manner, the computing device may make consumer contact decisions based at least in part on a duration of time between the disconnect date and the notification date.

In another example, the computing device may determine that the established connect date for the text-capable contact number occurs prior to any disconnect date information that has been received by the computing device. As noted herein, subsequent or successive notifications to a particular consumer may be spaced apart by several months or even a year or two. Thus, one or more successful notification attempts made to the text-capable contact number can establish a connect date significantly in the past. This previously established connect date can aid in determining whether a disconnect date should be attributed to the consumer or a previous owner of the text-capable contact number. In certain examples, the operations of block 930 may be performed by the maintenance manager as described with reference to FIGS. 3 and 4.

At block 935, the computing device may determine to notify the consumer based on the disconnect date being before the established connect date for the text-capable contact number as described above with reference to FIGS. 1 through 8. For example, if the established connect date determined from one or more successful notification attempts made to the text-capable contact number is a date after the disconnect date, the computing device can make the determination that the disconnect activity associated with the disconnect date is attributed to a previous owner or, if the disconnect activity associated with the disconnect date was attributed to the consumer that the entity wishes to notify or contact, that the consumer has subsequently remedied any issue with the provider of the text-capable contact number and is the current owner of the text-capable contact number.

If, however, the established connect date determined is a date before the disconnect date, the computing device can make the determination that the disconnect activity associated with the disconnect date is attributed to the consumer that the entity wishes to notify or contact, even if the disconnect date is substantially earlier (e.g., nine months or more) than the notification date. In certain examples, the operations of block 935 may be performed by the maintenance manager as described with reference to FIGS. 3 and 4.

Figure 10:
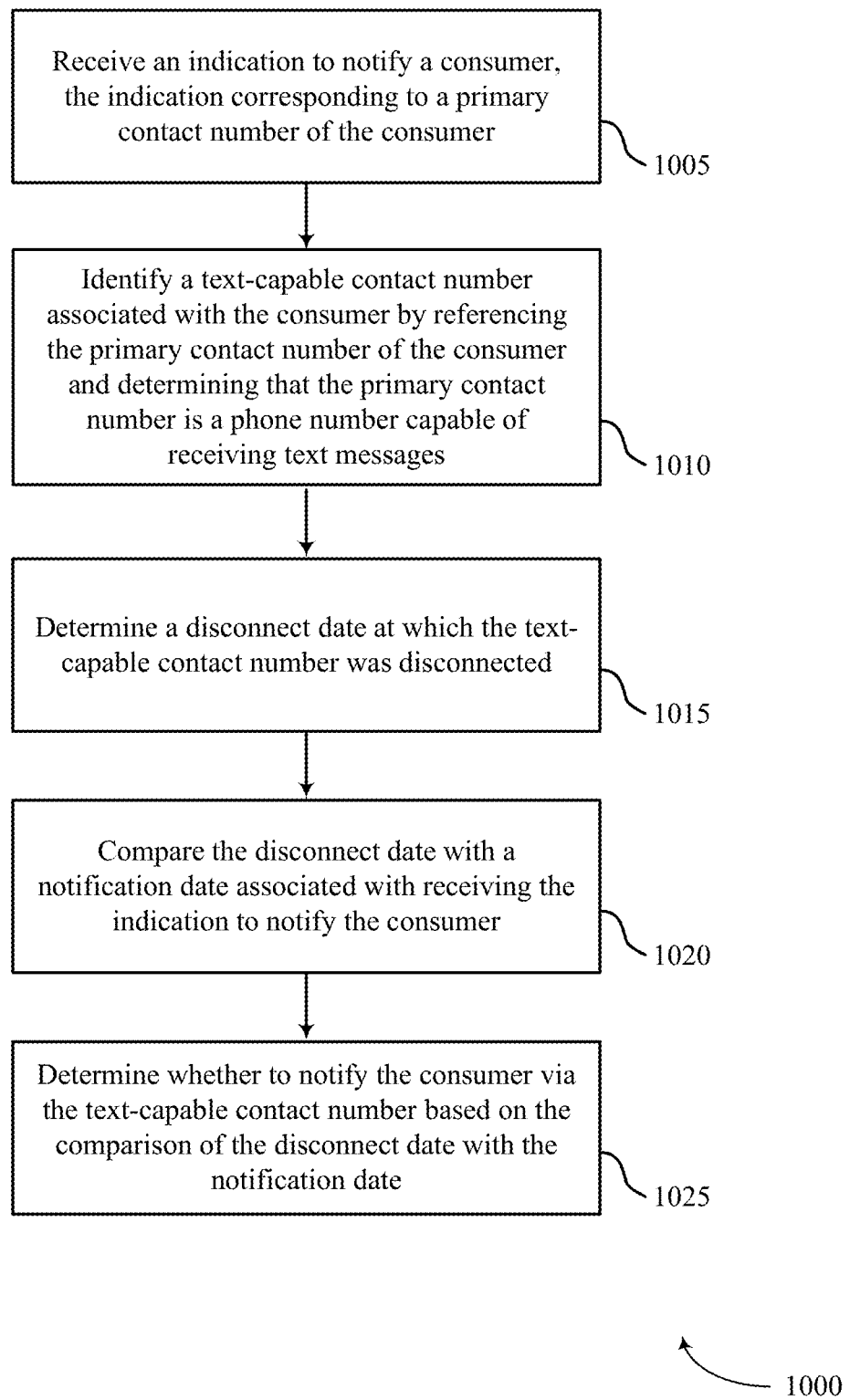

FIG. 10 shows a flowchart illustrating a method 1000 for contacting consumers in accordance with various aspects of the present disclosure. The operations of method 1000 may be implemented by a computing device (e.g., a server) such as consumer preference and maintenance interface server 110-*a*, consumer preference and maintenance interface server 110-*b*, consumer preference and maintenance interface server 110-*c*, or the one or more consumer preference and maintenance interface servers 110 or its components as described with reference to FIGS. 1 through 5. In some examples, the computing device may execute a set of codes to control the functional elements of the computing device to perform the functions described below. Additionally or alternatively, the computing device may perform aspects the functions described below using special-purpose hardware.

At block 1005, the computing device may receive an indication to notify a consumer as described above with reference to FIGS. 1 through 9. In some examples, the indication to notify the consumer may correspond to a primary contact number of the consumer. In some cases, the primary contact number can be different from the text-capable contact number. In these examples, the primary contact number may be identified on a list of 10-digit phone numbers and/or consumer identification information received by the computing device. In certain examples, the operations of block 1005 may be performed by the notification manager as described with reference to FIGS. 3 and 4.

At block 1010, the computing device may identify a text-capable contact number associated with the consumer as described above with reference to FIGS. 1 through 9. In some examples, the computing device may identify the text-capable number associated with the consumer by referencing the primary contact number of the consumer and determining that the primary contact number is a phone number capable of receiving text messages. In some examples, the computing device may receive the text-capable contact number as a substitute contact number for the consumer based at least in part on an opt-in process associated with the primary contact number. For example, the computing device may establish a call to the primary contact number of the consumer and may direct the consumer to enter a wireless phone number (or other text-capable phone number) as a communication or notification option to 'opt-in' to receive future messages via text messages (or email, some cases) via the entered substitute contact number that is then used as the text-capable contact number. In certain examples, the operations of block 1010 may be performed by the preference manager as described with reference to FIGS. 3 and 4.

At block 1015, the computing device may determine a disconnect date at which the text-capable contact number was disconnected as described above with reference to FIGS. 1 through 9. In certain examples, the operations of block 1015 may be performed by the maintenance manager as described with reference to FIGS. 3 and 5.

At block 1020, the computing device may compare the disconnect date with a notification date associated with receiving the indication to notify the consumer as described above with reference to FIGS. 1 through 9. In certain examples, the operations of block 1020 may be performed by the maintenance manager as described with reference to FIGS. 3 and 4.

At block 1025, the computing device may determine whether to notify the consumer via the text-capable contact number based on the comparison of the disconnect date with the notification date as described above with reference to FIGS. 1 through 9. In certain examples, the operations of block 1025 may be performed by the preference manager as described with reference to FIGS. 3 and 4.

Figure 11:
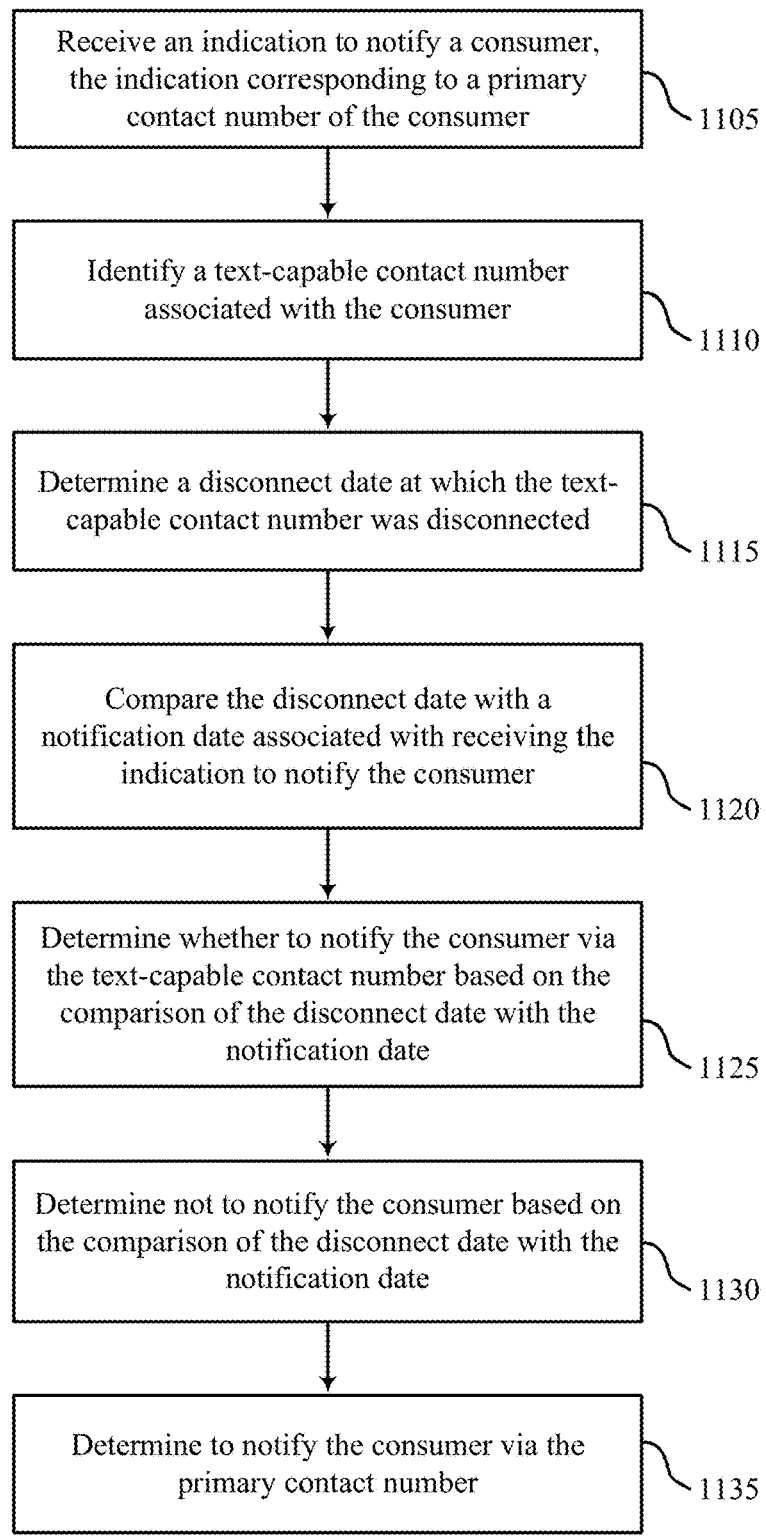

FIG. 11 shows a flowchart illustrating a method 1100 for contacting consumers in accordance with various aspects of the present disclosure. The operations of method 1100 may be implemented by a computing device (e.g., a server) such as consumer preference and maintenance interface server 110-*a*, consumer preference and maintenance interface server 110-*b*, consumer preference and maintenance interface server 110-*c*, or the one or more consumer preference and maintenance interface servers 110 or its components as described with reference to FIGS. 1 through 5. In some examples, the computing device may execute a set of codes to control the functional elements of the computing device to perform the functions described below. Additionally or alternatively, the computing device may perform aspects the functions described below using special-purpose hardware.

At block 1105, the computing device may receive an indication to notify a consumer as described above with reference to FIGS. 1 through 10. In some examples, the computing device may receive indication to notify the consumer corresponding to a primary contact number of the consumer. In some cases, the primary contact number can be different from the text-capable contact number. In these examples, the primary contact number may be identified on a list of 10-digit phone numbers and/or consumer identification information received by the computing device. In certain examples, the operations of block 1105 may be performed by the notification manager as described with reference to FIGS. 3 and 4.

At block 1110, the computing device may identify a text-capable contact number associated with the consumer as described above with reference to FIGS. 1 through 10. In certain examples, the operations of block 1110 may be performed by the preference manager as described with reference to FIGS. 3 and 4.

At block 1115, the computing device may determine a disconnect date at which the text-capable contact number was disconnected as described above with reference to FIGS. 1 through 10. In certain examples, the operations of block 1115 may be performed by the maintenance manager as described with reference to FIGS. 3 and 4.

At block 1120, the computing device may compare the disconnect date with a notification date associated with receiving the indication to notify the consumer as described above with reference to FIGS. 1 through 10. In some cases, the notification date is associated with receipt of the indication to notify the consumer (e.g., a list of 10-digit phone numbers and/or consumer identification information received by the computing device). In other cases, the notification date is associated with a predetermined date to notify the consumer (e.g., a date and/or time in the future after the list of 10-digit phone numbers was sent at which the entity wishes the consumer or consumers to be notified or contacted). In certain examples, the operations of block 1120 may be performed by the maintenance manager as described with reference to FIGS. 3 and 4.

At block 1125, the computing device may determine whether to notify the consumer via the text-capable contact number based on the comparison of the disconnect date with the notification date as described above with reference to FIGS. 1 through 10. In certain examples, the operations of block 1125 may be performed by the preference manager as described with reference to FIGS. 3 and 4.

At block 1130, the computing device may determine not to notify the consumer (via the text-capable contact number) based on the comparison of the disconnect date of the text-capable contact number with the notification date as described above with reference to FIGS. 1 through 10. In certain examples, the operations of block 1130 may be performed by the notification manager as described with reference to FIGS. 3 and 4.

At block 1135, the computing device may determine to notify the consumer via the primary contact number as described above with reference to FIGS. 1 through 10. For example, the computing device may determine that the text-capable contact number (as provided by the consumer as a substitute contact number) has likely been disconnected and is not a reliable method for contacting the consumer. However, the computing device may determine that the primary contact number is a valid number. For example, the computing device may determine that the primary contact number is valid by comparing the notification date associated with the primary contact number with the disconnect information (e.g., determining that no disconnect date for the primary contact number exists in the disconnect information or that a disconnect date for the primary contact number can be attributed to a previous owner of the primary contact number). In certain examples, the operations of block 1135 may be performed by the preference manager as described with reference to FIGS. 3 and 4.

Figure 12:
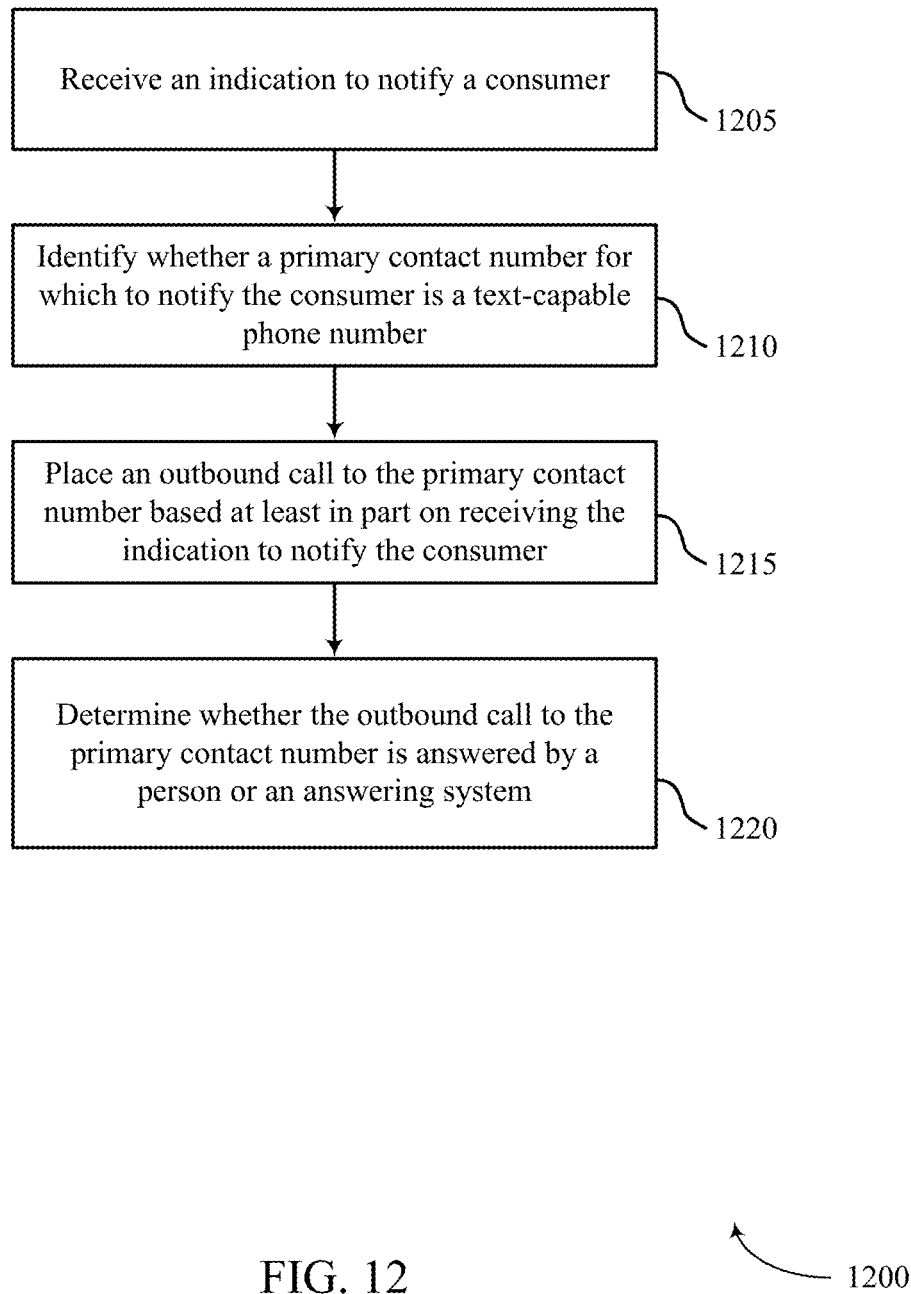

FIG. 12 shows a flowchart illustrating a method 1200 for contacting consumers in accordance with various aspects of the present disclosure. The operations of method 1200 may be implemented by a computing device (e.g., a server) such as consumer preference and maintenance interface server 110-*a*, consumer preference and maintenance interface server 110-*b*, consumer preference and maintenance interface server 110-*c*, or the one or more consumer preference and maintenance interface servers 110 or its components as described with reference to FIGS. 1 through 5. In some examples, the computing device may execute a set of codes to control the functional elements of the computing device to perform the functions described below. Additionally or alternatively, the computing device may perform aspects the functions described below using special-purpose hardware.

At block 1205, the computing device may receive an indication to notify a consumer as described above with reference to FIGS. 1 through 11. In certain examples, the operations of block 1205 may be performed by the notification manager as described with reference to FIGS. 3 and 4.

At block 1210, the computing device may identify whether a primary contact number for which to notify the consumer is a text-capable phone number as described above with reference to FIGS. 1 through 10. In certain examples, the operations of block 1210 may be performed by the preference manager as described with reference to FIGS. 3 and 4.

At block 1215, the computing device may place an outbound call to the primary contact number based at least in part on receiving the indication to notify the consumer as described above with reference to FIGS. 1 through 11. In certain examples, the operations of block 1215 may be performed by the notification manager (e.g., in cooperation with the transmitter and/or receiver) as described with reference to FIGS. 3 and 4.

At block 1220, the computing device may determine whether the outbound call to the primary contact number is answered by a person or an answering system as described above with reference to FIGS. 1 through 11. In certain examples, the operations of block 1220 may be performed by the notification manager (e.g., in cooperation with the transmitter and/or receiver) as described with reference to FIGS. 3 and 4.

In some examples, when the computing device identifies the primary contact number as not being a text-capable phone number and determines that the outbound call is answered by a person, the computing device may provide a future communications message (e.g., a recording stating: "If you would like to receive future messages via text, please enter your wireless phone number") and a prompt to allow the consumer to enter a substitute contact number for receiving future communications via text messages.

The computing device may then receive the entered digits of the substitute contact number (e.g., a wireless phone number or other text-capable phone number of the consumer) via the prompt process. The computing device may determine that the substitute contact number is a text-capable phone number. Additionally, in some cases, the computing device may send a confirmation communication (e.g., a confirming text message) to the substitute contact number based at least in part on the determining that the substitute contact number is a text-capable phone number and receive an acknowledgement of the confirmation communication from the substitute contact number (e.g., a return text from the wireless phone number or other text-capable phone number of the consumer).

In some examples, when identifying whether the primary contact number for which to notify the consumer is a text-capable contact number, the computing device may perform a real-time database dip on the primary contact number to ascertain whether a phone number of the primary contact number is associated with a text-capable carrier entity. In other examples, when identifying whether the primary contact number for which to notify the consumer is a text-capable contact number, the computing device may access a local disconnect activity database of the computing device, the local disconnect activity database including known text-capable phone numbers and non-text-capable phone numbers.

In some example, the computing device may determine that the substitute contact number is different from the primary contact number and may send the substitute contact number to a third-party entity computing device (e.g., a server or device different from the computer device) based at least in part on the substitute contact number is different from the primary contact number.

In other examples, when the computing device determines that the outbound call is answered by answering system, the computing device may provide a callback message that includes a designated telephone number for the consumer to call (e.g., a recording stating: "Please call 800-123-4567 to receive information regarding . . . "). The computing device may receive an incoming call on the designated telephone number and determine whether the incoming call is associated with identifiable consumer identification information (e.g., the primary contact number associated with a consumer previously contacted).

In some examples, when the computing device identifies the primary contact number as a text-capable phone number and determines that the incoming call is the primary contact number, the computing device may provide a future communications message (e.g., a recording stating: "If you would like to receive future messages via text to this wireless number, please press the number 1") and a prompt to allow the consumer to select the primary contact number for receiving future communications via text messages. In other examples, when the computing device identifies the primary contact number as not being a text-capable phone number and determines that the incoming call is the primary contact number, the computing device may provide a future communications message (e.g., a recording stating: "If you would like to receive future messages via text, please enter your wireless phone number") and a prompt to allow the consumer to enter a substitute contact number for receiving future communications via text messages.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for consumer preference and maintenance interface.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Thus, aspects of the disclosure may provide for techniques for contacting consumers using a consumer preference and maintenance interface. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of consumer contact comprising:
   receiving, by a computing device, an indication to notify a consumer;
   identifying that a primary contact number for which to notify the consumer is a text-capable phone number;
   placing an outbound call to the primary contact number based at least in part on the receiving the indication to notify the consumer;
   determining that the outbound call to the primary contact number is answered by a person; and
   providing a future communications message and a prompt to allow the consumer to receive future communications via text messages to the primary contact number, the providing being based at least in part on the identifying that the primary contact number for which to notify the consumer is a text-capable phone number and the determining that the outbound call to the primary contact number is answered by a person.

2. The method of claim 1, further comprising:
   receiving an indication responsive to the prompt that the consumer allows future communications to be received via text messages to the primary contact number.

3. The method of claim 2, wherein the indication responsive to the prompt corresponds to a defined digit pressed by the person.

4. The method of claim 1, further comprising:
   providing an additional prompt to allow the consumer to enter a substitute contact number for receiving future communications via text message.

5. The method of claim 4, further comprising:
   receiving the substitute contact number;
   determining that the substitute contact number is a text-capable phone number;
   sending a confirmation communication to the substitute contact number based at least in part on the determining that the substitute contact number is a text-capable phone number; and
   receiving an acknowledgement of the confirmation communication from the substitute contact number.

6. The method of claim 5, further comprising:
   determining that the substitute contact number is different from the primary contact number; and
   updating contact information of the consumer based at least in part on the substitute contact number being different from the primary contact number.

7. The method of claim 6, further comprising:
   sending the substitute contact number to a third-party entity computing device based at least in part on the substitute contact number being different from the primary contact number.

8. The method of claim 1, wherein the identifying that a primary contact number for which to notify the consumer is a text-capable phone number comprises:
   performing a real-time database dip on the primary contact number to ascertain that a phone number of the primary contact number is associated with a text-capable carrier entity.

9. The method of claim 1, wherein the identifying that a primary contact number for which to notify the consumer is a text-capable phone number comprises:

accessing a local disconnect activity database of the computing device, the local disconnect activity database including known text-capable phone numbers and non-text-capable phone numbers.

10. A method of consumer contact comprising:

receiving, by a computing device, an indication to notify a consumer;

identifying that a primary contact number for which to notify the consumer is a text-capable phone number;

placing an outbound call to the primary contact number based at least in part on the receiving the indication to notify the consumer;

determining that the outbound call to the primary contact number is answered by a person; and providing a future communications message that includes a designated telephone number to be called to allow the consumer to receive future communications via text messages to the primary contact number, the providing being based at least in part on the identifying that the primary contact number for which to notify the consumer is a text-capable phone number and the determining that the outbound call to the primary contact number is answered by a person.

11. The method of claim 10, further comprising:

receiving an incoming call on the designated telephone number;

determining that the incoming call is from the primary contact number; and determining that the consumer allows future communications to be received via text messages to the primary contact number based at least in part on the determining that the incoming call is from the primary contact number.

12. The method of claim 10, wherein the identifying that a primary contact number for which to notify the consumer is a text-capable phone number comprises:

performing a real-time database dip on the primary contact number to ascertain that a phone number of the primary contact number is associated with a text-capable carrier entity.

13. The method of claim 10, wherein the identifying that a primary contact number for which to notify the consumer is a text-capable phone number comprises:

accessing a local disconnect activity database of the computing device, the local disconnect activity database including known text-capable phone numbers and non-text-capable phone numbers.

14. A method of consumer contact comprising:

identifying, by a computing device, a text-capable contact number associated with a consumer to be contacted;

receiving a disconnect record indicating that the text-capable contact number was disconnected by a carrier entity;

analyzing the text-capable contact number and at least one disconnect data element of the received disconnect record; and determining that the text-capable contact number is valid for communications to the consumer based at least in part on the analyzing and irrespective of the received disconnect record.

15. The method of claim 14, further comprising:

receiving an indication to notify the consumer; and determining to notify the consumer based at least in part on the receiving the indication and the determining that the text-capable contact number is valid.

16. The method of claim 14, wherein the at least one disconnect data element is a disconnect date, and the method further comprising:

comparing the disconnect date with a notification date corresponding to an indication to notify the consumer.

17. The method of claim 14, further comprising:

determining that the received disconnect record is network related based at least in part on the analyzing.

* * * * *